United States Patent
Hsueh et al.

(10) Patent No.: US 12,481,131 B2
(45) Date of Patent: Nov. 25, 2025

(54) IMAGING LENS SYSTEM, IMAGE CAPTURING UNIT AND ELECTRONIC DEVICE

(71) Applicant: LARGAN PRECISION CO., LTD., Taichung (TW)

(72) Inventors: Chun-Che Hsueh, Taichung (TW); Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 649 days.

(21) Appl. No.: 17/825,681

(22) Filed: May 26, 2022

(65) Prior Publication Data

US 2023/0314771 A1   Oct. 5, 2023

(51) Int. Cl.
  *G02B 13/00*  (2006.01)
  *G02B 9/64*  (2006.01)

(52) U.S. Cl.
  CPC ........... *G02B 13/0045* (2013.01); *G02B 9/64* (2013.01)

(58) Field of Classification Search
  None
  See application file for complete search history.

(56) References Cited

U.S. PATENT DOCUMENTS

| | | | |
|---|---|---|---|
| 3,606,524 A | 9/1971 | Ogura | |
| 3,734,600 A | 5/1973 | Shimizu | |
| 4,280,757 A | 7/1981 | Tojo | |
| 4,662,725 A | 5/1987 | Nisioka | |
| 5,404,246 A | 4/1995 | Kaneko et al. | |
| 5,754,345 A | 5/1998 | Yamamoto | |
| 5,798,870 A | 8/1998 | Mizusawa | |
| 5,822,129 A | 10/1998 | Sekine | |
| 2012/0081799 A1 | 4/2012 | Tseng et al. | |
| 2018/0003944 A1 | 1/2018 | Fujii | |
| 2020/0225459 A1 | 7/2020 | Harada | |
| 2021/0080693 A1 | 3/2021 | Asami | |
| 2021/0165187 A1 | 6/2021 | Nagahara | |

FOREIGN PATENT DOCUMENTS

| | | | |
|---|---|---|---|
| CN | 106249392 A | 12/2016 | |
| CN | 110824664 A | 2/2020 | |
| CN | 112305717 A * | 2/2021 | ......... G02B 13/0045 |

(Continued)

OTHER PUBLICATIONS

TW Office Action dated Jan. 4, 2023 as received in Application No. 111112551.

(Continued)

*Primary Examiner* — Phu Vu
(74) *Attorney, Agent, or Firm* — Maschoff Brennan

(57) ABSTRACT

An imaging lens system includes eight lens elements which are, in order from an object side to an image side along an optical path: a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side. The object-side surface of the third lens element is concave in a paraxial region thereof. When specific conditions are satisfied, the requirements of wide field of view, compact size and high image quality can be met by the imaging lens system, simultaneously.

9 Claims, 31 Drawing Sheets

(56) References Cited

FOREIGN PATENT DOCUMENTS

| | | |
|---|---|---|
| CN | 112363300 A | 2/2021 |
| CN | 112684583 A | 4/2021 |
| CN | 112698488 A | 4/2021 |
| CN | 112698494 A | 4/2021 |
| CN | 112698495 A | 4/2021 |
| CN | 213423586 U | 6/2021 |
| CN | 113589493 A | 11/2021 |
| CN | 114265186 A | 4/2022 |
| CN | 114545606 A | 5/2022 |
| CN | 216927240 U | 7/2022 |
| WO | 2022/124836 A1 | 6/2022 |

OTHER PUBLICATIONS

European Search Report dated Feb. 23, 2023 as received in Application No. 22181183.9.
IN Examination Report dated Aug. 19, 2025 in application No. 202334018578.

\* cited by examiner

IMAGING LENS SYSTEM, IMAGE CAPTURING UNIT AND ELECTRONIC DEVICE

RELATED APPLICATIONS

This application claims priority to Taiwan Application 111112551, filed on Mar. 31, 2022, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the third lens element is concave in a paraxial region thereof.

When a curvature radius of the object-side surface of the second lens element is R3, a curvature radius of the image-side surface of the second lens element is R4, a curvature radius of the object-side surface of the third lens element is R5, a central thickness of the third lens element is CT3, a focal length of the imaging lens system is f, a focal length of the fifth lens element is f5, and an axial distance between the first lens element and the second lens element is T12, the following conditions are satisfied:

$(R3+R4)/(R3-R4)<0.90;$ $0.26<CT3/f<2.20;$ $-1.60<f/f5<0.00;$ $f/R5<-0.20;$ and $0.30<T12/f<1.15.$ According to another aspect of the present disclosure, an imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the third lens element is concave in a paraxial region thereof. The object-side surface of the fourth lens element is convex in a paraxial region thereof. The fifth lens element has negative refractive power.

When a curvature radius of the object-side surface of the fourth lens element is R7, a curvature radius of the image-side surface of the fifth lens element is R10, a central thickness of the third lens element is CT3, a focal length of the imaging lens system is f, an axial distance between the first lens element and the second lens element is T12, a sum of axial distances between each of all adjacent lens elements of the imaging lens system is $\Sigma AT$, and an axial distance between the object-side surface of the first lens element and the image-side surface of the eighth lens element is TD, the following conditions are satisfied:

$(R7+R10)/(R7-R10)<0.50;$ $0.26<CT3/f<2.20;$ $0.40<T12/f<1.20;$ and $0.23<\Sigma AT/TD<0.50.$ According to another aspect of the present disclosure, an imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the third lens element is concave in a paraxial region thereof. The fifth lens element has negative refractive power.

When a curvature radius of the object-side surface of the third lens element is R5, a curvature radius of the object-side surface of the fourth lens element is R7, a curvature radius of the image-side surface of the fifth lens element is R10, a curvature radius of the object-side surface of the sixth lens element is R11, a curvature radius of the image-side surface of the sixth lens element is R12, a central thickness of the sixth lens element is CT6, and a focal length of the imaging lens system is f, an f-number of the imaging lens system is FNO, the following conditions are satisfied:

$(R11+R12)/(R11-R12)<-0.03;$ $(R7+R10)/(R7-R10)<0.85;$ $0.35<CT6/f<0.90;$ $f/R5<-0.30;$ and $1.00<FNO<3.00.$ According to another aspect of the present disclosure, an image capturing unit includes one of the aforementioned imaging lens systems and an image sensor, wherein the image sensor is disposed on an image surface of the imaging lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
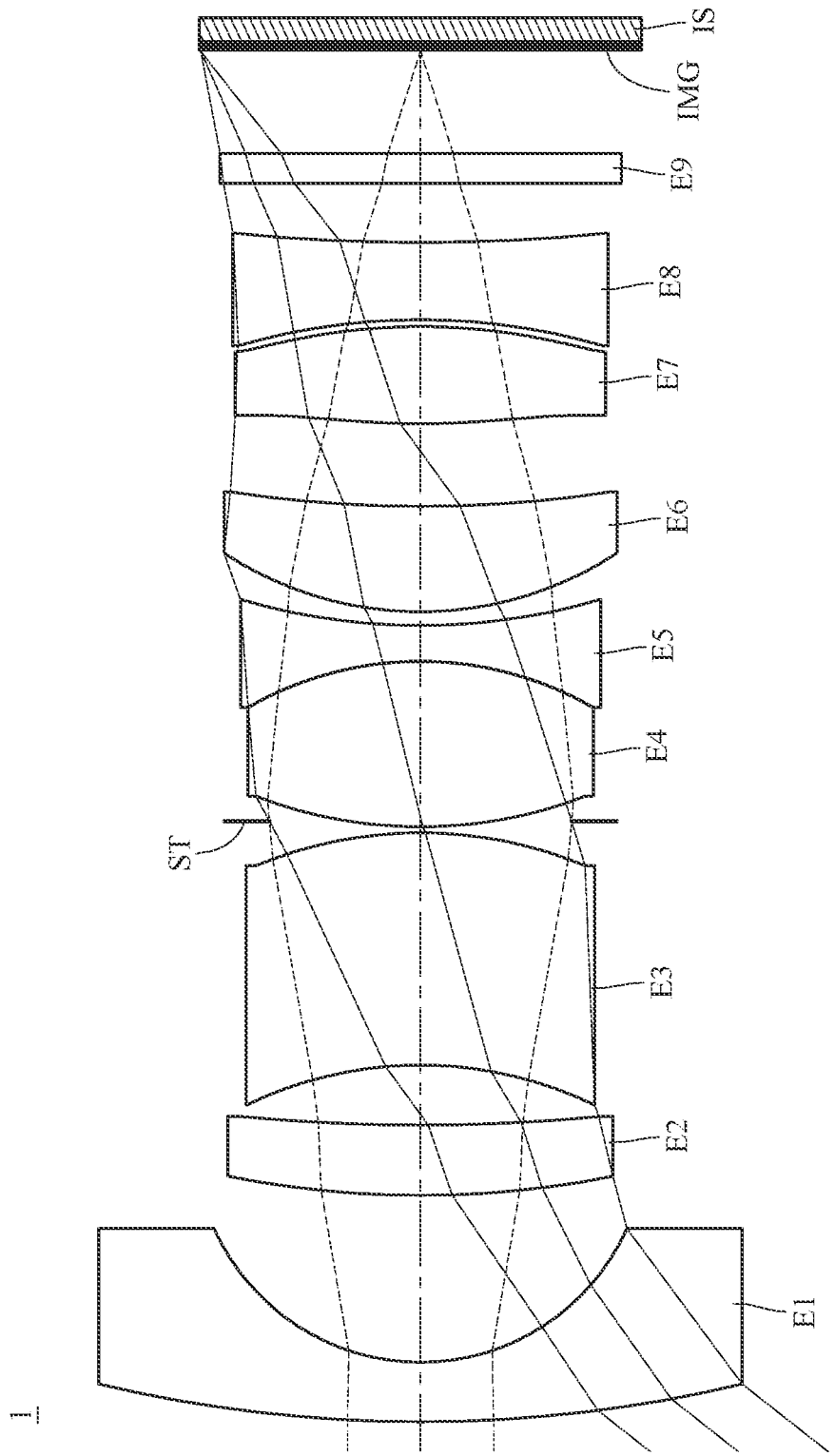
FIG. 1 is a schematic view of an image capturing unit according to the 1st embodiment of the present disclosure.

An imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the third lens element is concave in a paraxial region thereof. Therefore, it is favorable for adjusting the travelling direction of light so as to balance the size distribution of the imaging lens system.

The fourth lens element can have positive refractive power. Therefore, it is favorable for combining the fourth lens element with the fifth lens element so as to correct aberrations such as spherical aberration. The object-side surface of the fourth lens element can be convex in a paraxial region thereof. Therefore, it is favorable for adjusting the travelling direction of light so as to increase the image surface.

The fifth lens element can have negative refractive power. Therefore, it is favorable for adjusting the refractive power configuration of the imaging lens system so as to obtain a proper balance between the field of view and the size distribution.

The sixth lens element can have positive refractive power. Therefore, it is favorable for reducing the size at the image side of the imaging lens system. The object-side surface of the sixth lens element can be convex in a paraxial region thereof. Therefore, it is favorable for adjusting the lens shape of the first lens element so as to correct aberrations such as astigmatism.

The eighth lens element can have negative refractive power. Therefore, it is favorable for correcting aberrations generated due to reduction in size.

According to the present disclosure, the imaging lens system can further include an aperture stop located between the third lens element and the fourth lens element. Therefore, it is favorable for adjusting the position of the aperture stop so as to increase relative illuminance on the peripheral field of view and to increase the field of view.

When a curvature radius of the object-side surface of the second lens element is R3, and a curvature radius of the image-side surface of the second lens element is R4, the following condition can be satisfied: $(R3+R4)/(R3-R4)<0.90$. Therefore, it is favorable for adjusting the lens shape and the refractive power of the second lens element so as to reduce the effective radius of the second lens element. Moreover, the following condition can also be satisfied: $(R3+R4)/(R3-R4)<0.80$. Moreover, the following condition can also be satisfied: $-9.00<(R3+R4)/(R3-R4)<0.30$. Moreover, the following condition can also be satisfied: $-8.00<(R3+R4)/(R3-R4)<0.00$.

When a central thickness of the third lens element is CT3, and a focal length of the imaging lens system is f, the following condition can be satisfied: $0.26<CT3/f<2.20$. Therefore, it is favorable for adjusting the ratio of the central thickness of the third lens element to the overall focal length so as to obtain a proper balance between the total track length and image quality of the imaging lens system. Moreover, the following condition can also be satisfied: $0.30<CT3/f<1.50$. Moreover, the following condition can also be satisfied: $0.30<CT3/f<1.15$.

When the focal length of the imaging lens system is f, and a focal length of the fifth lens element is f5, the following condition can be satisfied: $-1.60<f/f5<0.00$. Therefore, it is favorable for adjusting the refractive power of the fifth lens element so as to reduce the effective radii of lens elements at an image side of the fifth lens element, thereby reducing the sizes of the lens elements.

When the focal length of the imaging lens system is f, and a curvature radius of the object-side surface of the third lens element is R5, the following condition can be satisfied: $f/R5<-0.20$. Therefore, it is favorable for adjusting the ratio of the overall focal length to the curvature radius of the object-side surface of the third lens element, increasing the field of view and reducing the effective radius of the third lens element, thereby reducing the size of the imaging lens system. Moreover, the following condition can also be satisfied: $f/R5<-0.30$. Moreover, the following condition can also be satisfied: $-2.00<f/R5<-0.40$.

When an axial distance between the first lens element and the second lens element is T12, and the focal length of the imaging lens system is f, the following condition can be satisfied: $0.30<T12/f<1.15$. Therefore, it is favorable for adjusting the ratio of the lens interval between the first and second lens elements to the overall focal length so as to obtain a proper balance between the total track length and the field of view of the imaging lens system. Moreover, the following condition can also be satisfied: $0.40<T12/f<1.20$. Moreover, the following condition can also be satisfied: $0.45<T12/f<1.00$.

When a curvature radius of the object-side surface of the fourth lens element is R7, and a curvature radius of the image-side surface of the fifth lens element is R10, the following condition can be satisfied: $(R7+R10)/(R7-R10)<0.85$. Therefore, it is favorable for adjusting the lens shapes and the refractive powers of the fourth and fifth lens elements so as to correct chromatic aberration at the overall field of view. Moreover, the following condition can also be satisfied: $(R7+R10)/(R7-R10)<0.50$. Moreover, the following condition can also be satisfied: $-8.00<(R7+R10)/(R7-R10)<0.00$.

When a sum of axial distances between each of all adjacent lens elements of the imaging lens system is $\Sigma AT$, and an axial distance between the object-side surface of the first lens element and the image-side surface of the eighth lens element is TD, the following condition can be satisfied: $0.23<\Sigma AT/TD<0.50$. Therefore, it is favorable for adjusting the ratio of all axial distances of imaging lens system to the distance between the object-side surface of the first lens element and the image-side surface of the eighth lens element so as to obtain a proper balance between volume usage rate and manufacturing difficulty of the imaging lens system.

When a curvature radius of the object-side surface of the sixth lens element is R11, and a curvature radius of the image-side surface of the sixth lens element is R12, the following condition can be satisfied: $(R11+R12)/(R11-R12)<0.55$. Therefore, it is favorable for adjusting the lens shape and the refractive power of the sixth lens element so as to correct chromatic aberration at the central field of view. Moreover, the following condition can also be satisfied: $(R11+R12)/(R11-R12)<-0.03$. Moreover, the following condition can also be satisfied: $(R11+R12)/(R11-R12)<-0.15$. Moreover, the following condition can also be satisfied: $-3.00<(R11+R12)/(R11-R12)<-0.20$.

When a central thickness of the sixth lens element is CT6, and the focal length of the imaging lens system is f, the following condition can be satisfied: $0.35<CT6/f<0.90$. Therefore, it is favorable for adjusting the ratio of the central thickness of the sixth lens element to the overall focal length so as to correct chromatic aberration at the central field of view and reduce light spot at the central field of view. Moreover, the following condition can also be satisfied: $0.40<CT6/f<0.75$.

When an f-number of the imaging lens system is FNO, the following condition can be satisfied: $1.00<FNO<3.00$. Therefore, it is favorable for adjusting the aperture size so as to obtain a proper balance between image quality at the overall field of view and relative illuminance at the peripheral field of view. Moreover, the following condition can also be satisfied: $1.00<FNO<2.50$. Moreover, the following condition can also be satisfied: $1.20<FNO<2.00$.

When the focal length of the imaging lens system is f, and a composite focal length of the seventh lens element and the eighth lens element is f78, the following condition can be satisfied: $f/f78<0.20$. Therefore, it is favorable for adjusting overall refractive power of the seventh and eighth lens elements so as to reduce the back focal length. Moreover, the following condition can also be satisfied: $-0.90<f/f78<0.20$. Moreover, the following condition can also be satisfied: $-1.00<f/f78<0.10$.

When the focal length of the imaging lens system is f, and a composite focal length of the fourth lens element and the fifth lens element is f45, the following condition can be satisfied: $0.00<f/f45<1.80$. Therefore, it is favorable for adjusting overall refractive power of the fourth and fifth lens elements so as to reduce influence of temperature effect on image quality. Moreover, the following condition can also be satisfied: $0.05<f/f45<1.00$.

When the axial distance between the first lens element and the second lens element is T12, and the axial distance between the object-side surface of the first lens element and the image-side surface of the eighth lens element is TD, the following condition can be satisfied: $0.10<T12/TD<0.30$. Therefore, it is favorable for adjusting ratio of the lens interval between the first and second lens elements to the distance between the object-side surface of the first lens element and the image-side surface of the eighth lens element so as to reduce influence of temperature effect.

When a central thickness of the first lens element is CT1, and the focal length of the imaging lens system is f, the following condition can be satisfied: $0.15<CT1/f<0.55$. Therefore, it is favorable for adjusting the ratio of the central thickness of the first lens element to the focal length of the imaging lens system, and it is also favorable for reducing manufacturing difficulty of lens elements so as to increase yield rate. Moreover, the following condition can also be satisfied: $0.20<CT1/f<0.40$.

When a refractive index of the fourth lens element is N4, and a refractive index of the fifth lens element is N5, the following condition can be satisfied: $1.63<(N4+N5)/2<1.95$. Therefore, it is favorable for adjusting the average refractive power of the fourth and fifth lens elements so as to increase the field of view. Moreover, the following condition can also be satisfied: $1.67<(N4+N5)/2<1.90$.

When a curvature radius of the object-side surface of the first lens element is R1, and a curvature radius of the image-side surface of the first lens element is R2, the following condition can be satisfied: $-1.40<(R1+R2)/(R1-R2)$. Therefore, it is favorable for adjusting the lens shape and the refractive power of the first lens element so as to receive light at the relatively large field of view. Moreover, the following condition can also be satisfied: $0.00<(R1+R2)/(R1-R2)<3.00$.

When an Abbe number of the fourth lens element is V4, the following condition can be satisfied: $32.0<V4<72.0$. Therefore, it is favorable for adjusting the Abbe number of the fourth lens element so as to correct chromatic aberration. Moreover, the following condition can also be satisfied: $38.0<V4<65.0$.

When the focal length of the imaging lens system is f, and a focal length of the sixth lens element is f6, the following condition can be satisfied: $0.20<f/f6<2.00$. Therefore, it is favorable for adjusting the refractive power of the sixth lens element so as to correct astigmatism.

When the focal length of the imaging lens system is f, and a composite focal length of the fourth lens element, the fifth lens element and the sixth lens element is f456, the following condition can be satisfied: $0.30<f/f456<1.00$. Therefore, it is favorable for adjusting overall refractive power among the fourth to sixth lens elements so as to obtain a proper balance between correction of chromatic aberration and reduction in total track length of the imaging lens system. Moreover, the following condition can also be satisfied: $0.30<f/f456<0.85$.

When a refractive index of the sixth lens element is N6, the following condition can be satisfied: $1.60<N6<2.00$. Therefore, it is favorable for adjusting the refractive power of the sixth lens element so as to reduce the effective radius of the sixth lens element and the total track length of the imaging lens system, thereby achieving miniaturization. Moreover, the following condition can also be satisfied: $1.60<N6<1.90$.

When the sum of axial distances between each of all adjacent lens elements of the imaging lens system is $\Sigma AT$, and an axial distance between the fifth lens element and the sixth lens element is T56, the following condition can be satisfied: $2.00<\Sigma AT/T56$. Therefore, it is favorable for adjusting the ratio of all axial distances of the imaging lens system to the lens interval between the fifth and sixth lens elements so as to correct field curvature at the peripheral field of view. Moreover, the following condition can also be satisfied: $3.00<\Sigma AT/T56<80.00$.

When a curvature radius of the object-side surface of the eighth lens element is R15, and a curvature radius of the image-side surface of the eighth lens element is R16, the following condition can be satisfied: $(R15+R16)/(R15-R16)<2.00$. Therefore, it is favorable for adjusting the lens shape and the refractive power of the eighth lens element so as to reduce the back focal length. Moreover, the following condition can also be satisfied: $-6.00<(R15+R16)/(R15-R16)<1.00$.

When a refractive index of the eighth lens element is N8, the following condition can be satisfied: $1.60<N8<2.00$. Therefore, it is favorable for adjusting the refractive power of the eighth lens element so as to reduce the chief ray angle at the peripheral field of view incident on the image surface, thereby increasing image quality. Moreover, the following condition can also be satisfied: $1.65<N8<1.96$.

When the central thickness of the third lens element is CT3, and a sum of central thicknesses of all lens elements of the imaging lens system is $\Sigma CT$, the following condition can be satisfied: $0.10<CT3/\Sigma CT<0.40$. Therefore, it is favorable for adjusting the ratio of the central thickness of the third lens element to all central thicknesses of the imaging lens system so as to obtain a proper balance between manufacturing errors and reduction in temperature effect.

When a central thickness of the fourth lens element is CT4, a central thickness of the fifth lens element is CT5, an axial distance between the fourth lens element and the fifth lens element is T45, and the axial distance between the object-side surface of the first lens element and the image-side surface of the eighth lens element is TD, the following condition can be satisfied: $0.09<(CT4+T45+CT5)/TD<0.20$. Therefore, it is favorable for adjusting the track length of lens elements at the middle portion of the imaging lens system so as to increase overall volume usage rate.

When an Abbe number of the eighth lens element is V8, the following condition can be satisfied: $12.0<V8<40.0$. Therefore, it is favorable for adjusting the Abbe number of the eighth lens element so as to obtain a proper balance between correction of chromatic aberration and reduction in the back focal length. Moreover, the following condition can also be satisfied: $15.0<V8<30.0$.

According to the present disclosure, the aforementioned features and conditions can be utilized in numerous combinations so as to achieve corresponding effects.

According to the present disclosure, the lens elements of the imaging lens system can be made of either glass or plastic material. When the lens elements are made of glass material, the refractive power distribution of the imaging lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 29:
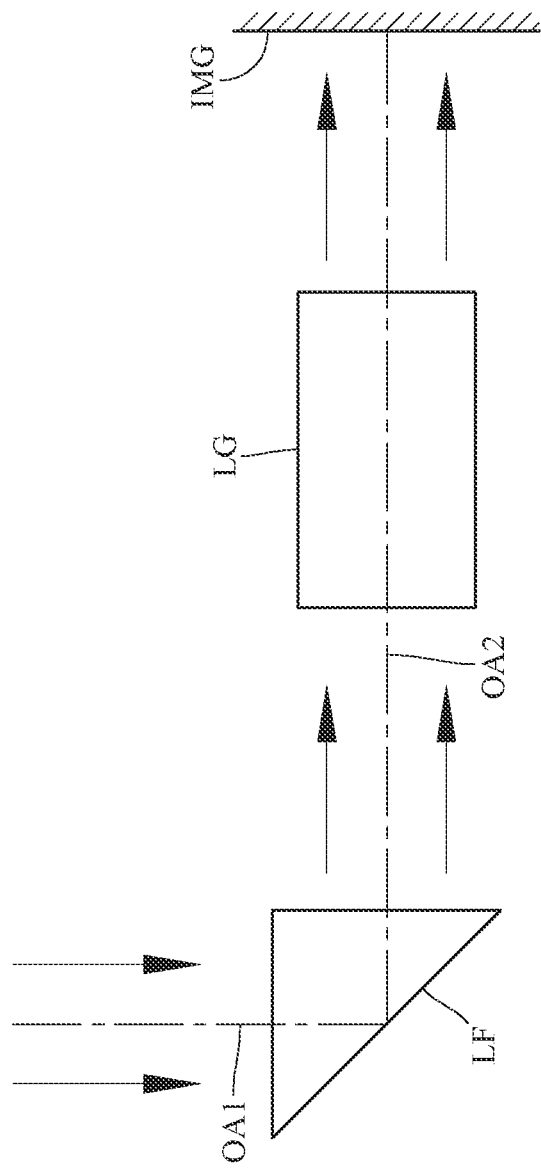
FIG. 29 shows a schematic view of a configuration of a light-folding element in an imaging lens system according to one embodiment of the present disclosure.
Figure 30:
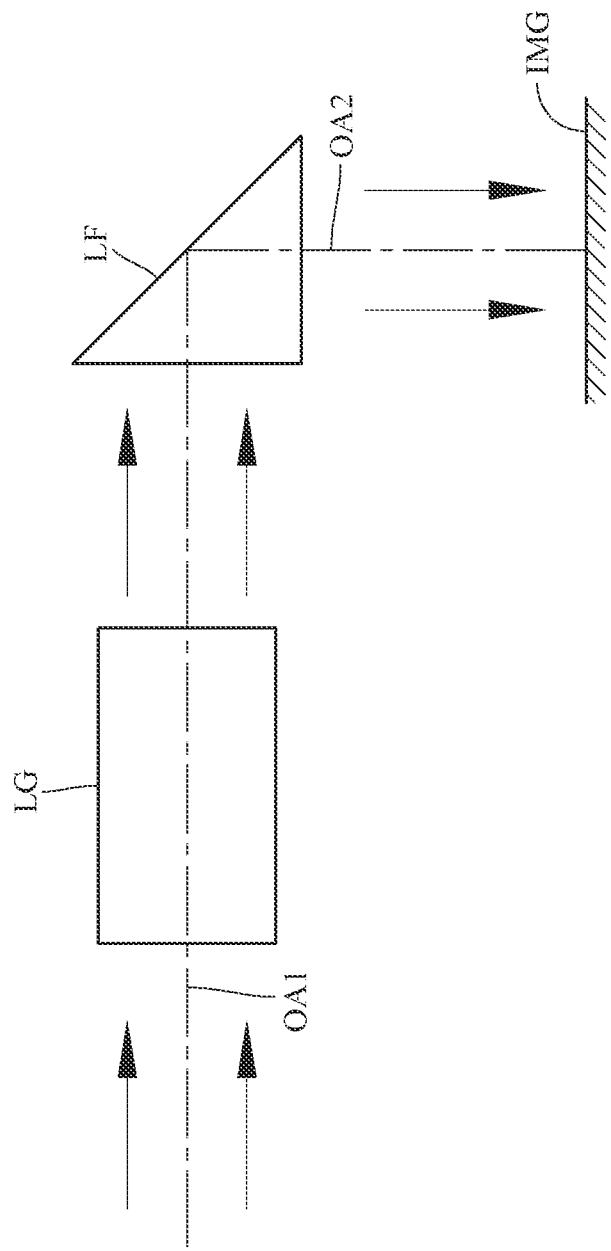
FIG. 30 shows a schematic view of another configuration of a light-folding element in an imaging lens system according to one embodiment of the present disclosure.
Figure 31:
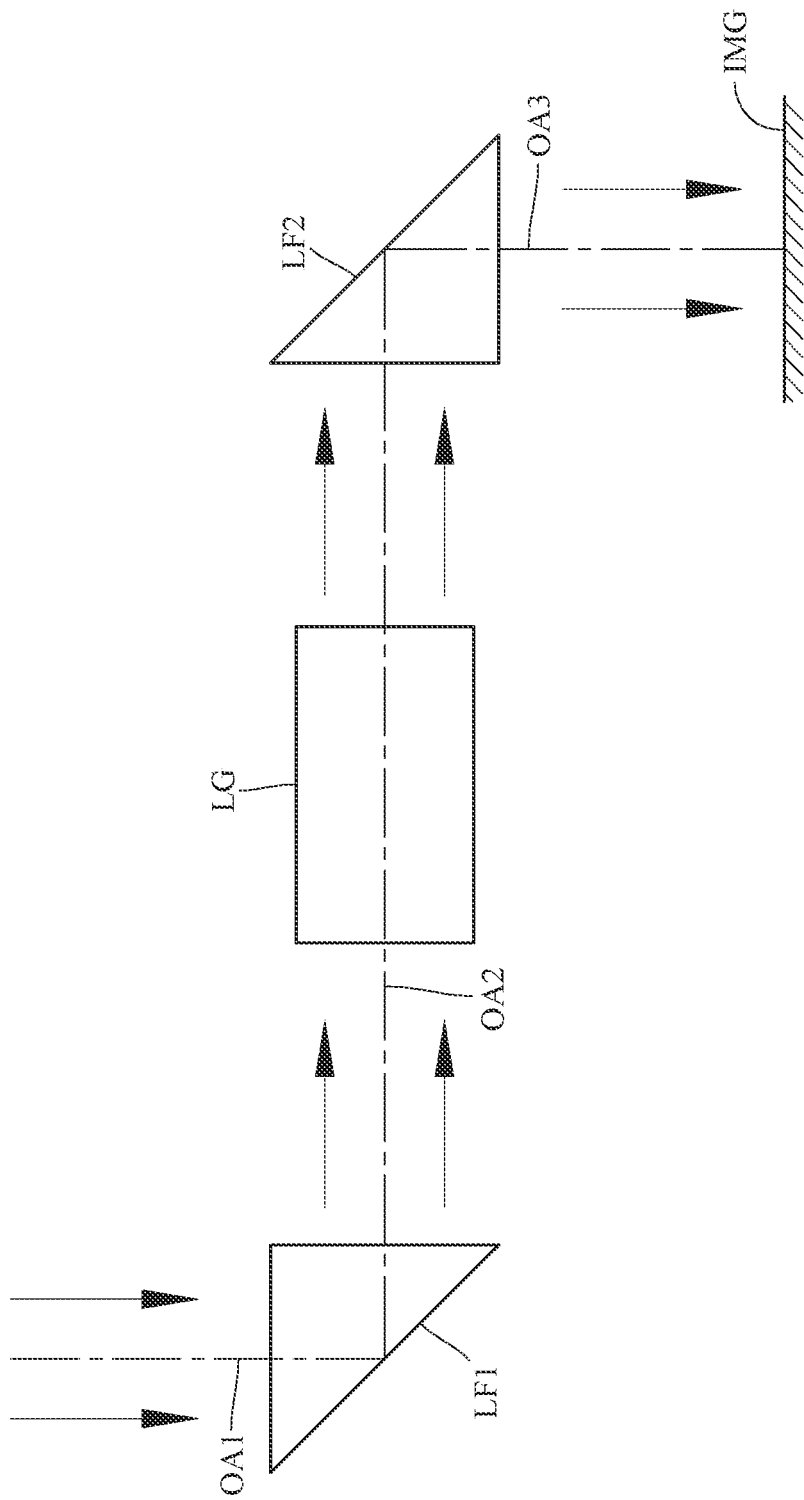
FIG. 31 shows a schematic view of a configuration of two light-folding elements in an imaging lens system according to one embodiment of the present disclosure.

According to the present disclosure, at least one light-folding element, such as a prism or a mirror, can be optionally disposed between an imaged object and the image surface on the imaging optical path, such that the imaging lens system can be more flexible in space arrangement, and therefore the dimensions of an electronic device is not restricted by the total track length of the imaging lens system. Specifically, please refer to FIG. 29 and FIG. 30. FIG. 29 shows a schematic view of a configuration of a light-folding element in an imaging lens system according to one embodiment of the present disclosure, and FIG. 30 shows a schematic view of another configuration of a light-folding element in an imaging lens system according to one embodiment of the present disclosure. In FIG. 29 and FIG. 30, the imaging lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging lens system as shown in FIG. 29 or disposed between a lens group LG of the imaging lens system and the image surface IMG as shown in FIG. 30. Furthermore, please refer to FIG. 31, which shows a schematic view of a configuration of two light-folding elements in an imaging lens system according to one embodiment of the present disclosure. In FIG. 31, the imaging lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging lens system, the second light-folding element LF2 is disposed between the lens group LG of the imaging lens system and the image surface IMG, and the travelling direction of light on the first optical axis OA1 can be the same direction as the travelling direction of light on the third optical axis OA3 as shown in FIG. 31. The imaging lens system can be optionally provided with three or more light-folding elements, and the present disclosure is not limited to the type, amount and position of the light-folding elements of the embodiments disclosed in the aforementioned figures.

According to the present disclosure, the imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the present disclosure, the imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging lens system can include one or more optical elements for limiting the form of light passing through the imaging lens system. Each optical element can be, but not limited to, a filter, a polarizer, etc., and each optical element can be, but not limited to, a single-piece element, a composite component, a thin film, etc. The optical element can be located at the object side or the image side of the imaging lens system or between any two adjacent lens elements so as to allow light in a specific form to pass through, thereby meeting application requirements.

According to the above description of the present disclosure, the following specific embodiments are provided for further explanation.

1st Embodiment

FIG. 1 is a schematic view of an image capturing unit according to the 1st embodiment of the present disclosure.

Figure 2:
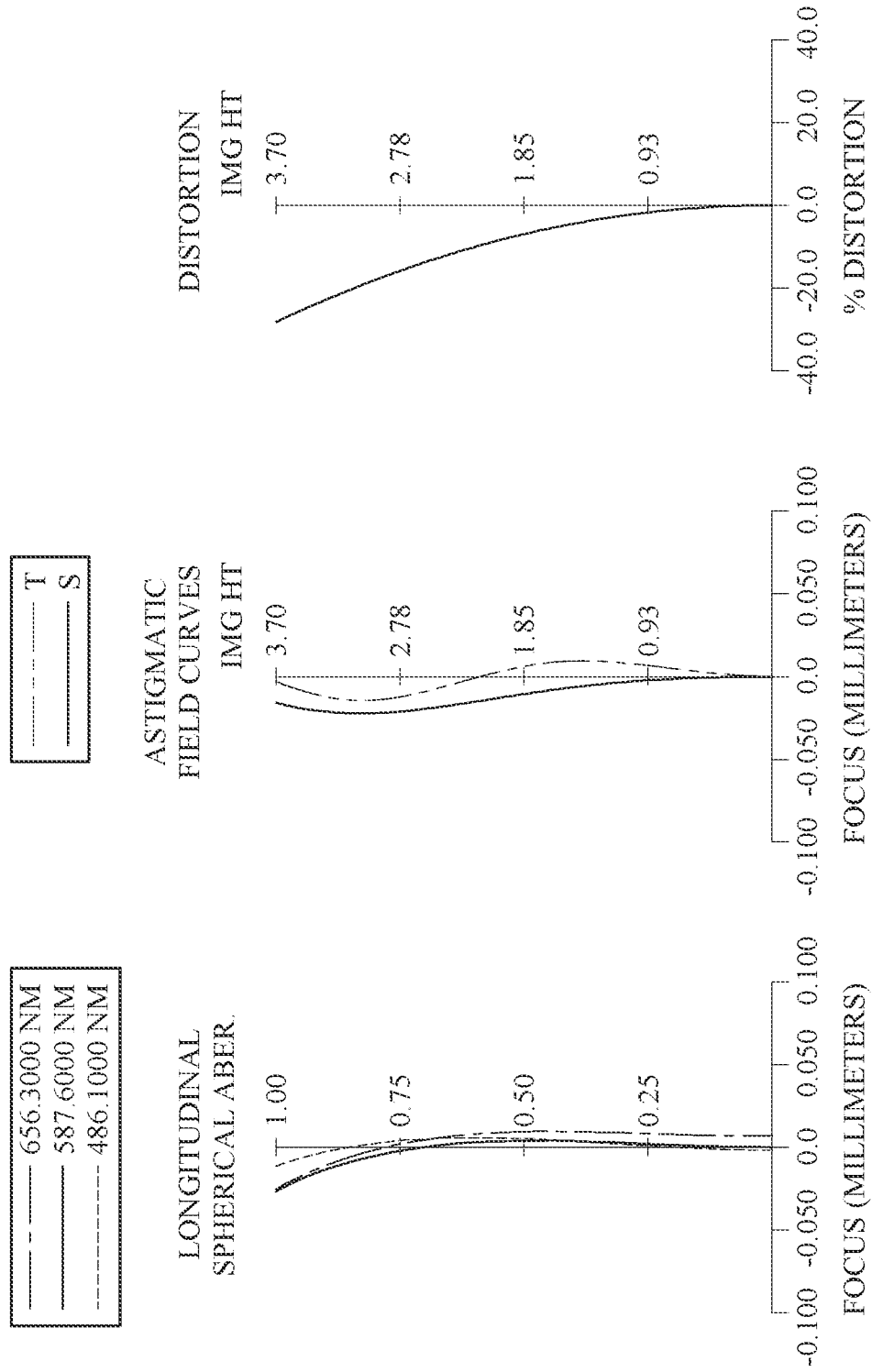
FIG. 2 shows spherical aberration curves, astigmatic field curves and a distortion curve of the image capturing unit according to the 1st embodiment.

FIG. 2 shows, in order from left to right, spherical aberration curves, astigmatic field curves and a distortion curve of the image capturing unit according to the 1st embodiment. In FIG. 1, the image capturing unit 1 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of glass material and has the object-side surface and the image-side surface being both spherical.

The third lens element E3 with positive refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being concave in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being concave in a paraxial region thereof. The sixth lens element E6 is made of glass material and has the object-side surface and the image-side surface being both spherical.

The seventh lens element E7 with positive refractive power has an object-side surface being convex in a paraxial region thereof and an image-side surface being convex in a paraxial region thereof. The seventh lens element E7 is made of glass material and has the object-side surface and the image-side surface being both aspheric. The object-side surface of the seventh lens element E7 has two inflection points. The image-side surface of the seventh lens element E7 has one inflection point. The object-side surface of the seventh lens element E7 has one critical point in an off-axis region thereof.

The eighth lens element E8 with negative refractive power has an object-side surface being concave in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the imaging lens system. The image sensor IS is disposed on or near the image surface IMG of the imaging lens system.

The equation of the aspheric surface profiles of the aforementioned lens elements of the 1st embodiment is expressed as follows:

$$X(Y)=(Y^2/R)/(1+\text{sqrt}(1-(1+k)\times(Y/R)^2))+\Sigma_i(Ai)\times(Y^i)$$

, where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the imaging lens system of the image capturing unit according to the 1st embodiment, when a focal length of the imaging lens system is f, an f-number of the imaging lens system is FNO, and half of a maximum field of view of the imaging lens system is HFOV, these parameters have the following values: f=4.05 millimeters (mm), FNO=1.65, HFOV=51.8 degrees (deg.).

When a central thickness of the fourth lens element E4 is CT4, a central thickness of the fifth lens element E5 is CT5, an axial distance between the fourth lens element E4 and the fifth lens element E5 is T45, and an axial distance between the object-side surface of the first lens element E1 and the image-side surface of the eighth lens element E8 is TD, the following condition is satisfied: (CT4+T45+CT5)/TD=0.17. In this embodiment, an axial distance between two adjacent lens elements is a distance in a paraxial region between two adjacent lens surfaces of the two adjacent lens elements.

When a curvature radius of the object-side surface of the first lens element E1 is R1, and a curvature radius of the image-side surface of the first lens element E1 is R2, the following condition is satisfied: (R1+R2)/(R1−R2)=1.39.

When a curvature radius of the object-side surface of the second lens element E2 is R3, and a curvature radius of the image-side surface of the second lens element E2 is R4, the following condition is satisfied: (R3+R4)/(R3−R4)=−3.25.

When a curvature radius of the object-side surface of the fourth lens element E4 is R7, and a curvature radius of the image-side surface of the fifth lens element E5 is R10, the following condition is satisfied: (R7+R10)/(R7−R10)=−6.18.

When a curvature radius of the object-side surface of the sixth lens element E6 is R11, and a curvature radius of the image-side surface of the sixth lens element E6 is R12, the following condition is satisfied: (R11+R12)/(R11−R12)=−1.82.

When a curvature radius of the object-side surface of the eighth lens element E8 is R15, and a curvature radius of the image-side surface of the eighth lens element E8 is R16, the following condition is satisfied: (R15+R16)/(R15−R16)=−0.48.

When a central thickness of the first lens element E1 is CT1, and a focal length of the imaging lens system is f, the following condition is satisfied: CT1/f=0.25.

When a central thickness of the third lens element E3 is CT3, and the focal length of the imaging lens system is f, the following condition is satisfied: CT3/f=0.96.

When a central thickness of the sixth lens element E6 is CT6, and the focal length of the imaging lens system is f, the following condition is satisfied: CT6/f=0.44.

When the central thickness of the third lens element E3 is CT3, and a sum of central thicknesses of all lens elements of the imaging lens system is ΣCT, the following condition is satisfied: CT3/ΣCT=0.28. In this embodiment, ΣCT is a sum of central thicknesses of the first lens element E1, the second lens element E2, the third lens element E3, the fourth lens element E4, the fifth lens element E5, the sixth lens element E6, the seventh lens element E7, and the eighth lens element E8.

When the focal length of the imaging lens system is f, and a composite focal length of the fourth lens element E4 and the fifth lens element E5 is f45, the following condition is satisfied: f/f45=0.21.

When the focal length of the imaging lens system is f, and a composite focal length of the fourth lens element E4, the fifth lens element E5 and the sixth lens element E6 is f456, the following condition is satisfied: f/f456=0.51.

When the focal length of the imaging lens system is f, and a focal length of the fifth lens element E5 is f5, the following condition is satisfied: f/f5=−0.74.

When the focal length of the imaging lens system is f, and a focal length of the sixth lens element E6 is f6, the following condition is satisfied: f/f6=0.37.

When the focal length of the imaging lens system is f, and a composite focal length of the seventh lens element E7 and the eighth lens element E8 is f78, the following condition is satisfied: f/f78=0.14.

When the focal length of the imaging lens system is f, and a curvature radius of the object-side surface of the third lens element E3 is R5, the following condition is satisfied: f/R5=−0.61.

When a refractive index of the fourth lens element E4 is N4, and a refractive index of the fifth lens element E5 is N5, the following condition is satisfied: (N4+N5)/2=1.701.

When a refractive index of the sixth lens element E6 is N6, the following condition is satisfied: N6=1.729.

When a refractive index of the eighth lens element E8 is N8, the following condition is satisfied: N8=1.893.

When an axial distance between the first lens element E1 and the second lens element E2 is T12, and the focal length of the imaging lens system is f, the following condition is satisfied: T12/f=0.69.

When the axial distance between the first lens element E1 and the second lens element E2 is T12, and the axial distance between the object-side surface of the first lens element E1 and the image-side surface of the eighth lens element E8 is TD, the following condition is satisfied: T12/TD=0.14.

When an Abbe number of the fourth lens element E4 is V4, the following condition is satisfied: V4=54.7.

When an Abbe number of the eighth lens element E8 is V8, the following condition is satisfied: V8=20.4.

When a sum of axial distances between each of all adjacent lens elements of the imaging lens system is ΣAT, and an axial distance between the fifth lens element E5 and the sixth lens element E6 is T56, the following condition is satisfied: ΣAT/T56=24.31. In this embodiment, ΣAT is a sum of axial distances between the first lens element E1 and the second lens element E2, the second lens element E2 and the third lens element E3, the third lens element E3 and the fourth lens element E4, the fourth lens element E4 and the fifth lens element E5, the fifth lens element E5 and the sixth lens element E6, the sixth lens element E6 and the seventh lens element E7, and the seventh lens element E7 and the eighth lens element E8.

When the sum of axial distances between each of all adjacent lens elements of the imaging lens system is ΣAT, and the axial distance between the object-side surface of the first lens element E1 and the image-side surface of the eighth lens element E8 is TD, the following condition is satisfied: ΣAT/TD=0.29.

The detailed optical data of the 1st embodiment are shown in Table 1A and the aspheric surface data are shown in Table 1B below.

TABLE 1A

1st Embodiment
f = 4.05 mm, FNO = 1.65, HFOV = 51.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 23.3500 | (SPH) | 1.000 | Glass | 1.583 | 59.4 | −7.93 |
| 2 | | 3.8000 | (SPH) | 2.808 | | | | |
| 3 | Lens 2 | 16.3100 | (SPH) | 1.182 | Glass | 1.846 | 17.9 | 39.53 |
| 4 | | 30.8000 | (SPH) | 1.011 | | | | |
| 5 | Lens 3 | −6.7000 | (SPH) | 3.908 | Glass | 1.518 | 63.5 | 111.89 |
| 6 | | −7.2000 | (SPH) | 0.189 | | | | |
| 7 | Ape. Stop | Plano | | −0.089 | | | | |
| 8 | Lens 4 | 7.6600 | (SPH) | 2.782 | Glass | 1.729 | 54.7 | 4.97 |
| 9 | | −5.8200 | (SPH) | 0.005 | Cemented | 1.514 | 38.8 | — |
| 10 | Lens 5 | −5.8200 | (SPH) | 0.600 | Glass | 1.673 | 32.1 | −5.51 |
| 11 | | 10.6200 | (SPH) | 0.233 | | | | |
| 12 | Lens 6 | 6.0200 | (SPH) | 1.770 | Glass | 1.729 | 54.7 | 11.07 |
| 13 | | 20.7800 | (SPH) | 1.392 | | | | |
| 14 | Lens 7 | 13.1600 | (ASP) | 1.634 | Glass | 1.806 | 40.9 | 7.38 |
| 15 | | −10.2600 | (ASP) | 0.116 | | | | |
| 16 | Lens 8 | −10.9400 | (SPH) | 1.298 | Glass | 1.893 | 20.4 | −8.94 |
| 17 | | 31.1700 | (SPH) | 1.000 | | | | |
| 18 | Filter | Plano | | 0.500 | Glass | 1.517 | 64.2 | — |
| 19 | | Plano | | 1.745 | | | | |
| 20 | Image | Plano | | — | | | | |

Note:
Reference wavelength is 587.6 nm (d-line).

TABLE 1B

| Aspheric Coefficients | | |
|---|---|---|
| Surface # | 14 | 15 |
| k= | −2.43760000E+01 | −6.77274000E−01 |
| A4= | −1.03195050E−03 | −4.54114690E−05 |
| A6= | 1.00543630E−06 | 4.49095740E−05 |
| A8= | −3.06879090E−05 | −1.38361500E−05 |
| A10= | 3.31892330E−06 | 1.57221160E−06 |
| A12= | 8.13154680E−08 | −3.68840000E−09 |

In Table 1A, the curvature radius, the thickness and the focal length are shown in millimeters (mm). Surface numbers 0-20 represent the surfaces sequentially arranged from the object side to the image side along the optical axis. In Table 1B, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
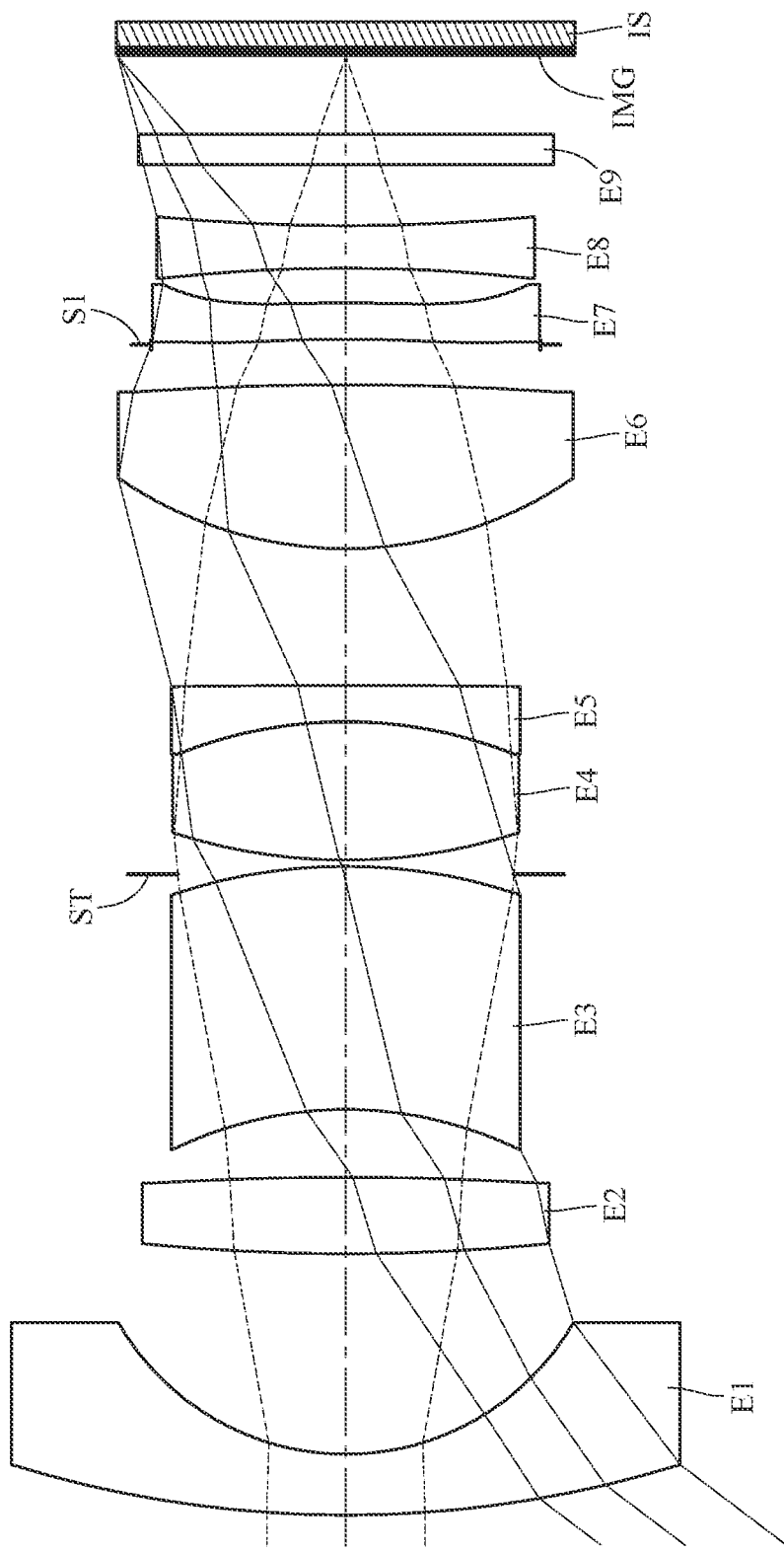
FIG. 3 is a schematic view of an image capturing unit according to the 2nd embodiment of the present disclosure.
Figure 4:
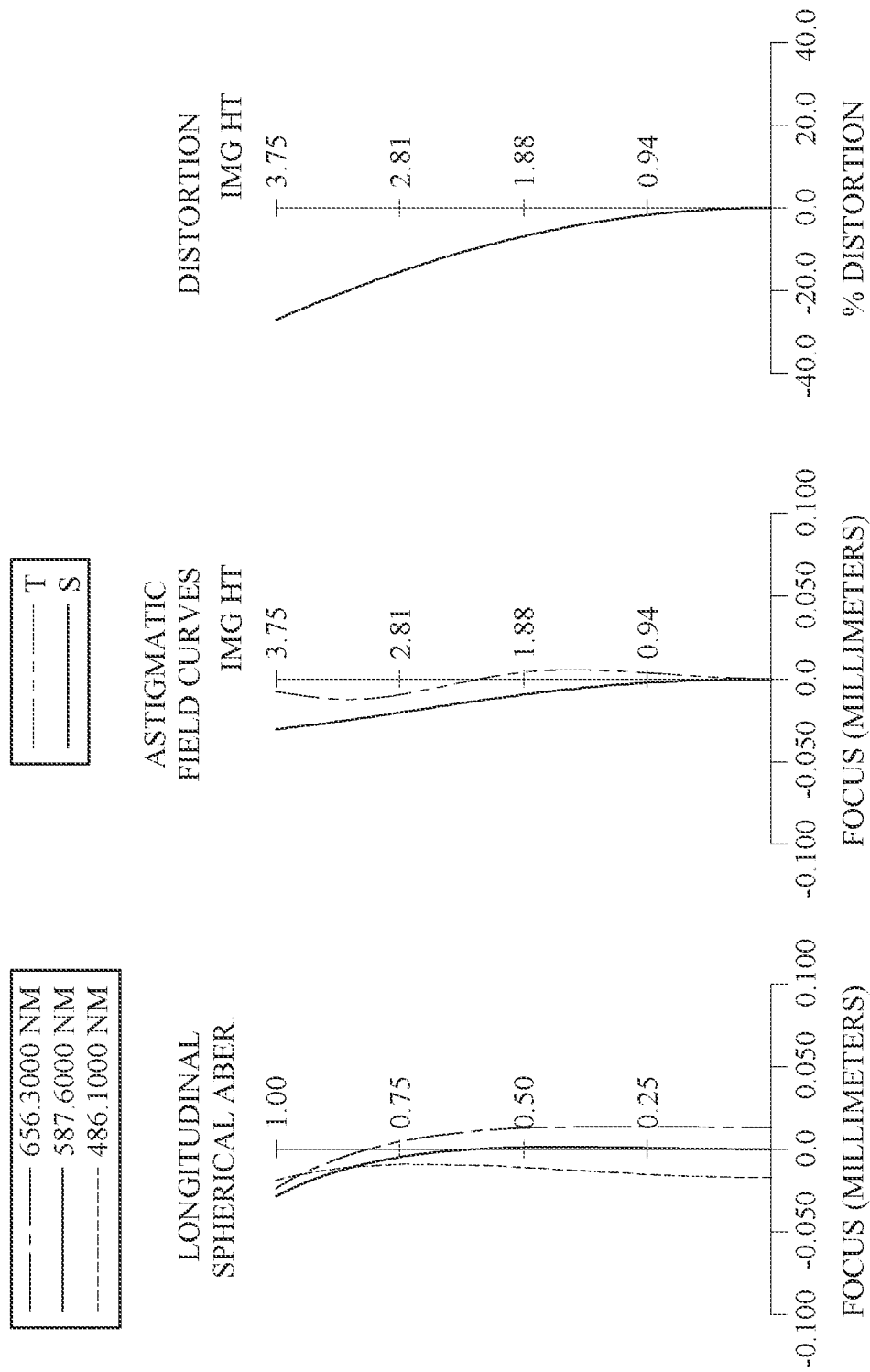
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a stop S1, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being convex in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being convex in a paraxial region thereof. The seventh lens element E7 is made of glass material and has the object-side surface and the image-side surface being both aspheric. The object-side surface of the seventh lens element E7 has two inflection points. The image-side surface of the seventh lens element E7 has one inflection point. The object-side surface of the seventh lens element E7 has two critical points in an off-axis region thereof. The image-side surface of the seventh lens element E7 has one critical point in an off-axis region thereof.

The eighth lens element E8 with negative refractive power has an object-side surface being concave in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 2nd embodiment are shown in Table 2A and the aspheric surface data are shown in Table 2B below.

TABLE 2A

2nd Embodiment
f = 3.90 mm, FNO = 1.50, HFOV = 52.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.6000 | (SPH) | 1.000 | Glass | 1.729 | 54.7 | −7.94 |
| 2 | | 4.3100 | (SPH) | 3.297 | | | | |
| 3 | Lens 2 | 34.0700 | (SPH) | 1.260 | Glass | 1.946 | 17.9 | 21.89 |
| 4 | | −51.8600 | (SPH) | 1.114 | | | | |

TABLE 2A-continued

2nd Embodiment
f = 3.90 mm, FNO = 1.50, HFOV = 52.9 deg.

| Surface # | | Curvature Radius | Thickness | Material | Index | Abbe # | Focal Length |
|---|---|---|---|---|---|---|---|
| 5 | Lens 3 | −6.4900 (SPH) | 4.000 | Glass | 1.802 | 44.3 | −106.36 |
| 6 | | −8.9500 (SPH) | −0.133 | | | | |
| 7 | Ape. Stop | Plano | 0.233 | | | | |
| 8 | Lens 4 | 9.2000 (SPH) | 2.273 | Glass | 1.729 | 54.7 | 6.00 |
| 9 | | −7.4600 (SPH) | 0.005 | Cemented | 1.514 | 38.8 | — |
| 10 | Lens 5 | −7.4600 (SPH) | 0.600 | Glass | 1.808 | 22.8 | −9.68 |
| 11 | | −168.8800 (SPH) | 2.244 | | | | |
| 12 | Lens 6 | 6.5900 (SPH) | 2.696 | Glass | 1.788 | 47.5 | 7.56 |
| 13 | | −51.0300 (SPH) | 0.657 | | | | |
| 14 | Stop | Plano | 0.090 | | | | |
| 15 | Lens 7 | −22.3700 (ASP) | 0.600 | Glass | 1.893 | 20.4 | −109.98 |
| 16 | | −29.3300 (ASP) | 0.571 | | | | |
| 17 | Lens 8 | −27.4700 (SPH) | 0.700 | Glass | 1.946 | 17.9 | −15.98 |
| 18 | | 34.0100 (SPH) | 1.000 | | | | |
| 19 | Filter | Plano | 0.500 | Glass | 1.517 | 64.2 | — |
| 20 | | Plano | 1.299 | | | | |
| 21 | Image | Plano | — | | | | |

Note:
Reference wavelength is 587.6 nm (d-line).
An effective radius of the stop S1 (Surface 14) is 3.200 mm.

TABLE 2B

Aspheric Coefficients

| Surface # | 15 | 16 |
|---|---|---|
| k= | −3.94556000E+01 | −4.32444000E+01 |
| A4= | 9.76479430E−04 | 3.89501940E−03 |
| A6= | 4.68620340E−04 | 5.09996560E−04 |
| A8= | −6.79720160E−05 | −5.36193130E−05 |
| A10= | 3.31149150E−06 | 2.27547070E−06 |
| A12= | −6.57944590E−08 | −6.12401520E−08 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Schematic Parameters

| f [mm] | 3.90 | f/f456 | 0.65 |
|---|---|---|---|
| FNO | 1.50 | f/f5 | −0.40 |
| HFOV [deg.] | 52.9 | f/f6 | 0.52 |
| (CT4 + T45 + CT5)/TD | 0.14 | f/f78 | −0.28 |
| (R1 + R2)/(R1 − R2) | 1.60 | f/R5 | −0.60 |
| (R3 + R4)/(R3 − R4) | −0.21 | (N4 + N5)/2 | 1.769 |
| (R7 + R10)/(R7 − R10) | −0.90 | N6 | 1.788 |
| (R11 + R12)/(R11 − R12) | −0.77 | N8 | 1.946 |
| (R15 + R16)/(R15 − R16) | −0.11 | T12/f | 0.85 |
| CT1/f | 0.26 | T12/TD | 0.16 |
| CT3/f | 1.03 | V4 | 54.7 |
| CT6/f | 0.69 | V8 | 17.9 |
| CT3/ΣCT | 0.30 | ΣAT/T56 | 3.60 |
| f/f45 | 0.29 | ΣAT/TD | 0.38 |

3rd Embodiment

Figure 5:
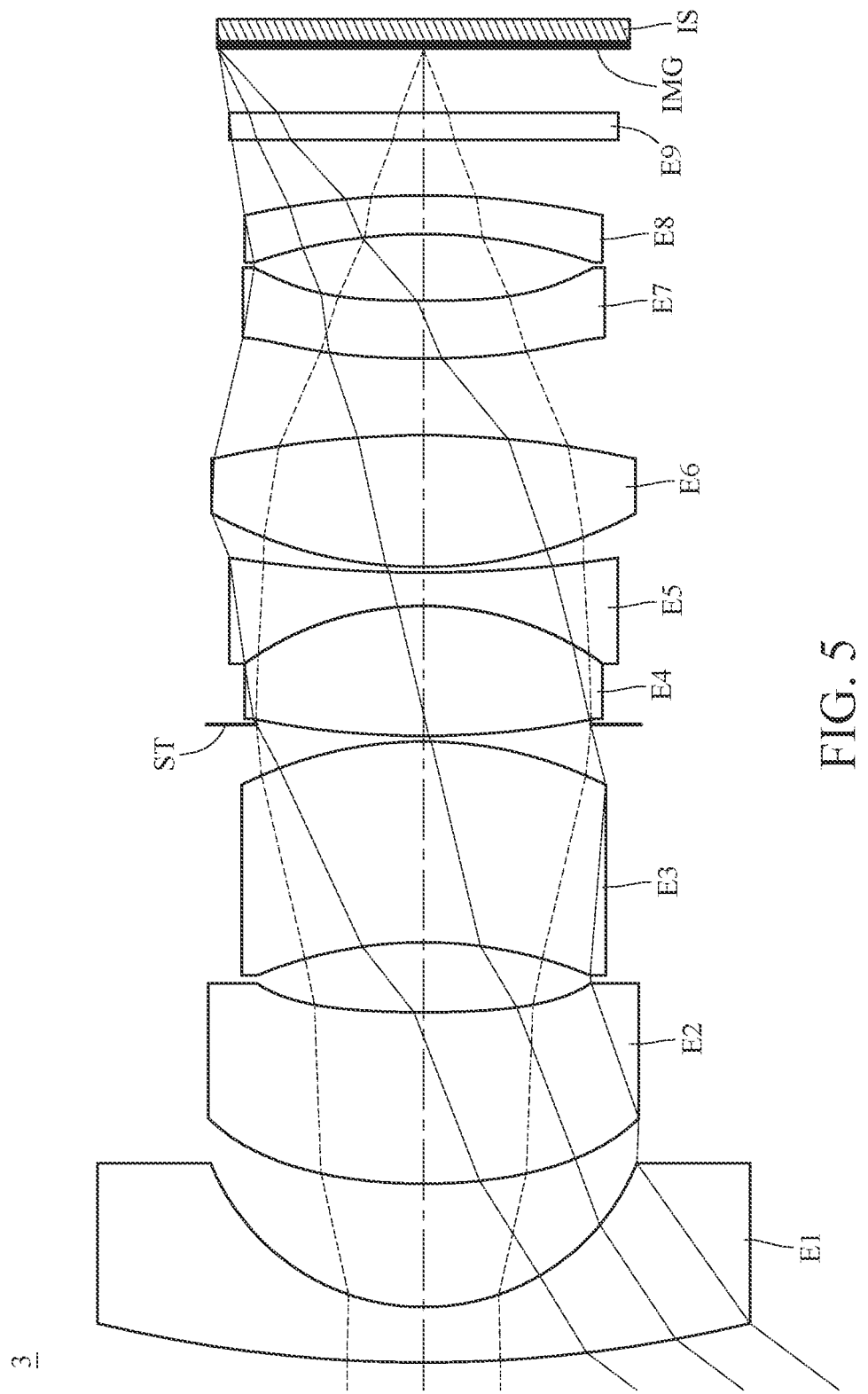
FIG. 5 is a schematic view of an image capturing unit according to the 3rd embodiment of the present disclosure.

FIG. 5 is a schematic view of an image capturing unit according to the 3rd embodiment of the present disclosure.

Figure 6:
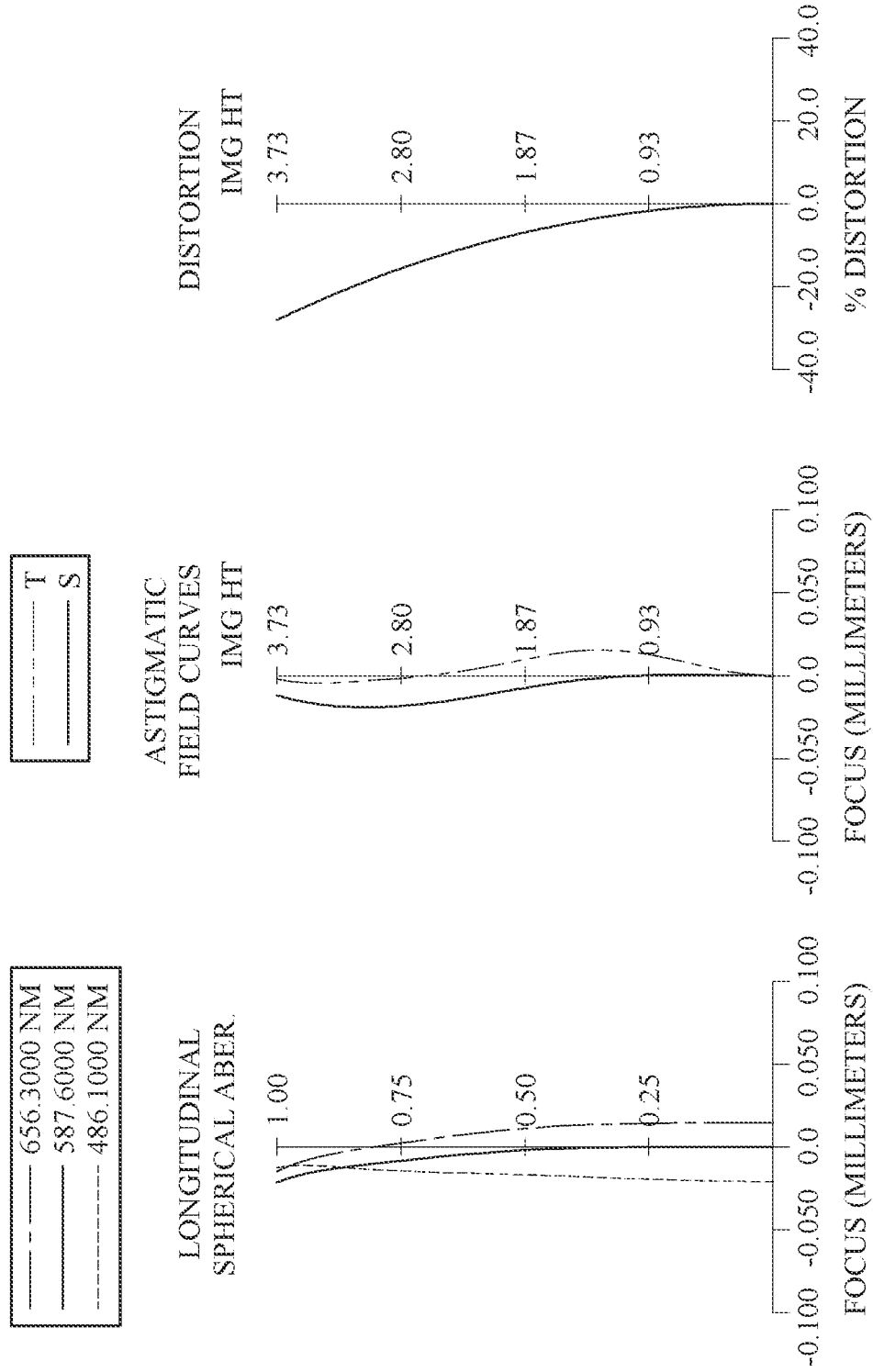
FIG. 6 shows spherical aberration curves, astigmatic field curves and a distortion curve of the image capturing unit according to the 3rd embodiment.

FIG. 6 shows, in order from left to right, spherical aberration curves, astigmatic field curves and a distortion curve of the image capturing unit according to the 3rd embodiment. In FIG. 5, the image capturing unit 3 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being concave in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point.

The eighth lens element E8 with negative refractive power has an object-side surface being concave in a paraxial region thereof and an image-side surface being convex in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 3rd embodiment are shown in Table 3A and the aspheric surface data are shown in Table 3B below.

TABLE 3A

3rd Embodiment
f = 3.89 mm, FNO = 1.40, HFOV = 53.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 24.9400 | (SPH) | 1.000 | Glass | 1.734 | 51.5 | −6.94 |
| 2 | | 4.1600 | (SPH) | 2.238 | | | | |
| 3 | Lens 2 | 10.0900 | (ASP) | 3.108 | Plastic | 1.686 | 18.4 | 24.74 |
| 4 | | 21.7700 | (ASP) | 1.267 | | | | |
| 5 | Lens 3 | −7.8900 | (SPH) | 3.641 | Glass | 1.729 | 54.7 | 37.09 |
| 6 | | −7.3000 | (SPH) | 0.302 | | | | |
| 7 | Ape. Stop | Plano | | −0.202 | | | | |
| 8 | Lens 4 | 15.8000 | (SPH) | 2.356 | Glass | 1.804 | 46.6 | 5.37 |
| 9 | | −5.5400 | (SPH) | 0.005 | Cemented | 1.550 | 43.9 | — |
| 10 | Lens 5 | −5.5400 | (SPH) | 0.600 | Glass | 1.741 | 27.8 | −5.99 |
| 11 | | 23.3000 | (SPH) | 0.100 | | | | |
| 12 | Lens 6 | 8.0700 | (SPH) | 2.387 | Glass | 1.729 | 54.7 | 7.87 |
| 13 | | −17.3600 | (SPH) | 1.393 | | | | |
| 14 | Lens 7 | 16.8000 | (ASP) | 1.043 | Plastic | 1.660 | 20.4 | 104.83 |
| 15 | | 21.6400 | (ASP) | 1.212 | | | | |
| 16 | Lens 8 | −9.4600 | (SPH) | 0.700 | Glass | 1.959 | 17.5 | −29.99 |
| 17 | | −14.6100 | (SPH) | 1.000 | | | | |
| 18 | Filter | Plano | | 0.500 | Glass | 1.517 | 64.2 | — |
| 19 | | Plano | | 1.157 | | | | |
| 20 | Image | Plano | | — | | | | |

Note:
Reference wavelength is 587.6 nm (d-line).

TABLE 3B

Aspheric Coefficients

| Surface # | 3 | 4 | 14 | 15 |
|---|---|---|---|---|
| k= | 4.49014000E+00 | 4.33410000E+01 | 1.15111000E+01 | 2.77343000E+01 |
| A4= | 4.20478500E−04 | 2.07018100E−03 | 1.98693020E−03 | 4.84218700E−03 |
| A6= | 5.87250370E−05 | 6.83945320E−05 | −5.87853570E−05 | −1.94482200E−05 |
| A8= | −9.76433870E−06 | −7.03939400E−06 | −1.04621560E−05 | 1.52886070E−06 |
| A10= | 1.01453940E−06 | 2.16279550E−06 | −1.03562280E−07 | −1.55925070E−06 |
| A12= | −5.40981500E−08 | −1.76486040E−07 | 2.39453670E−09 | 3.73781910E−08 |
| A14= | 1.04699590E−09 | 1.07581460E−09 | — | — |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Schematic Parameters

| | | | |
|---|---|---|---|
| f [mm] | 3.89 | f/f456 | 0.57 |
| FNO | 1.40 | f/f5 | −0.65 |
| HFOV [deg.] | 53.2 | f/f6 | 0.49 |
| (CT4 + T45 + CT5)/TD | 0.14 | f/f78 | −0.09 |
| (R1 + R2)/(R1 − R2) | 1.40 | f/R5 | −0.49 |
| (R3 + R4)/(R3 − R4) | −2.73 | (N4 + N5)/2 | 1.772 |
| (R7 + R10)/(R7 − R10) | −5.21 | N6 | 1.729 |
| (R11 + R12)/(R11 − R12) | −0.37 | N8 | 1.959 |
| (R15 + R16)/(R15 − R16) | −4.68 | T12/f | 0.58 |
| CT1/f | 0.26 | T12/TD | 0.11 |
| CT3/f | 0.94 | V4 | 46.6 |
| CT6/f | 0.61 | V8 | 17.5 |
| CT3/ΣCT | 0.25 | ΣAT/T56 | 63.15 |
| f/f45 | 0.13 | ΣAT/TD | 0.30 |

4th Embodiment

Figure 7:
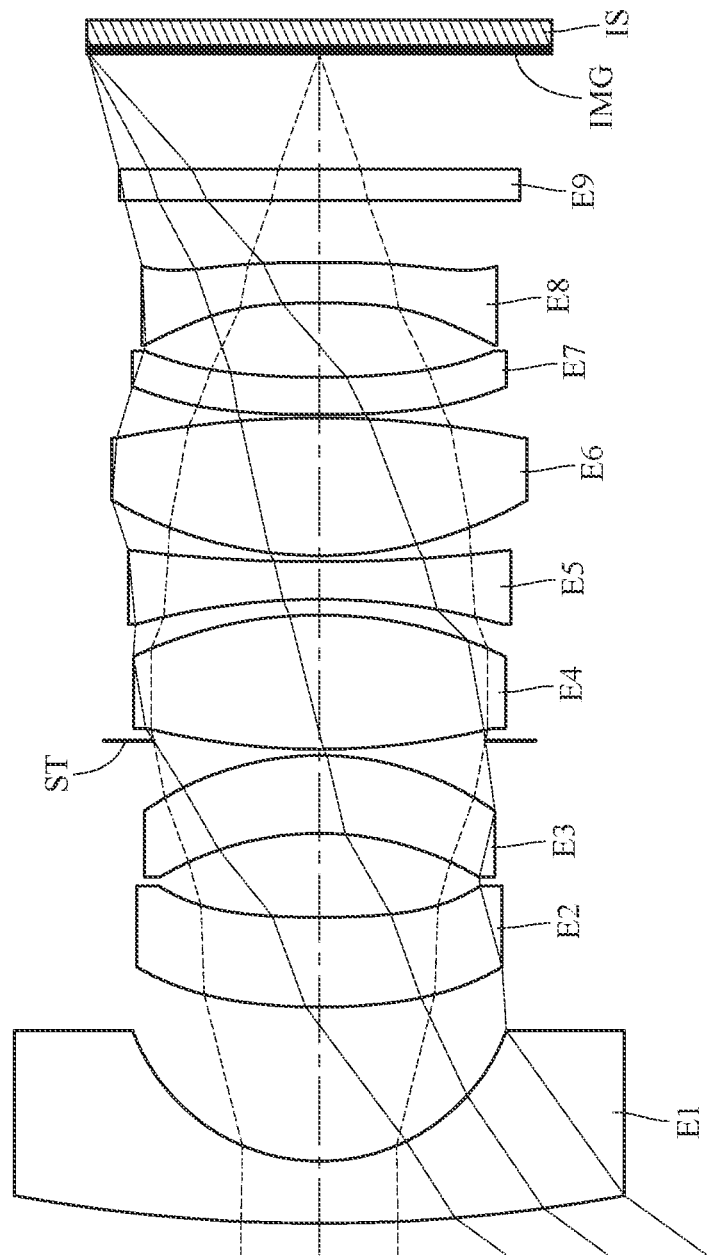
FIG. 7 is a schematic view of an image capturing unit according to the 4th embodiment of the present disclosure.
Figure 8:
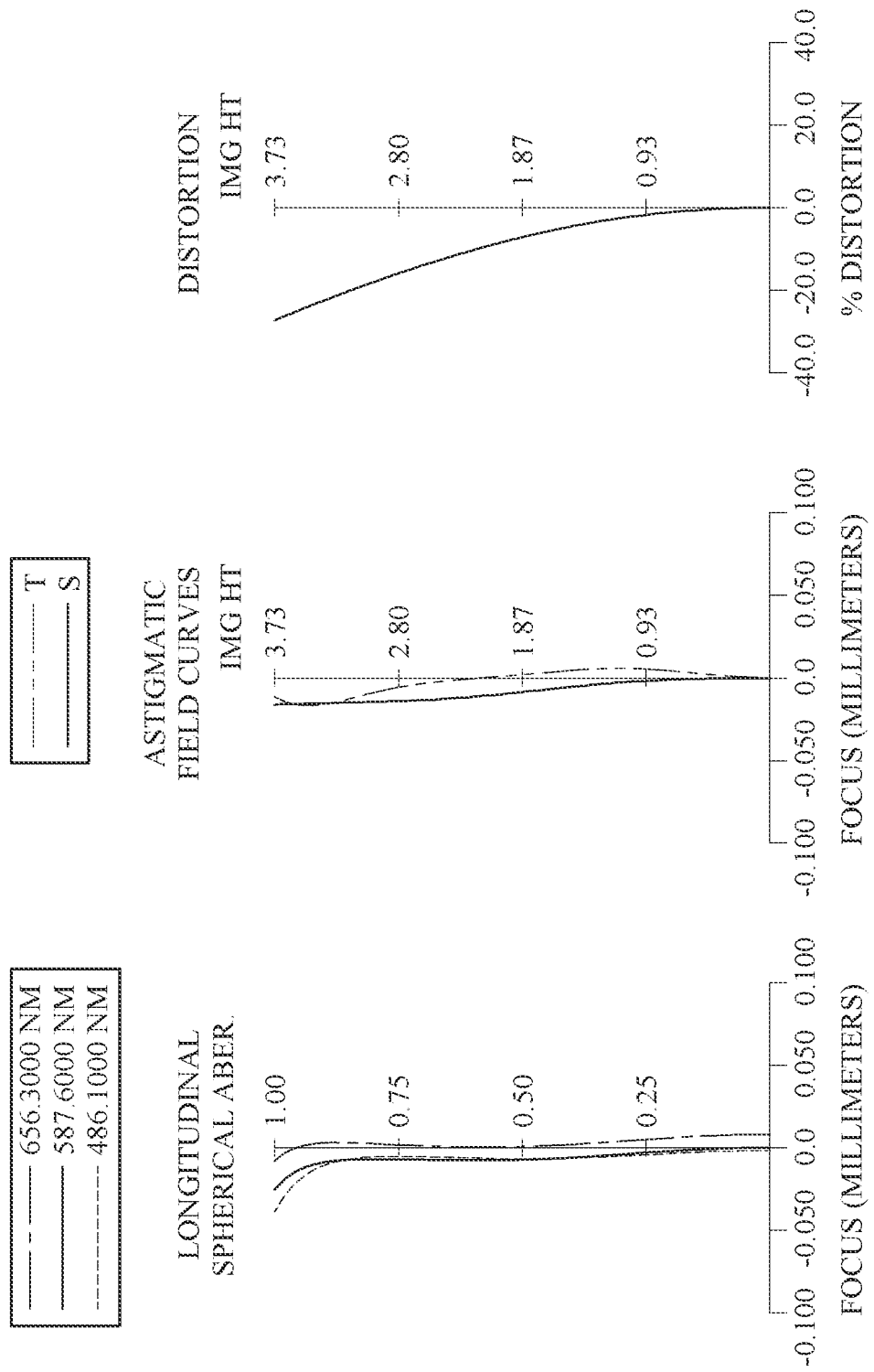
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being concave in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point.

The eighth lens element E8 with negative refractive power has an object-side surface being concave in a paraxial region thereof and an image-side surface being convex in a paraxial region thereof. The eighth lens element E8 is made of plastic material and has the object-side surface and the image-side surface being both aspheric. The image-side surface of the eighth lens element E8 has one inflection point. The image-side surface of the eighth lens element E8 has one critical point in an off-axis region thereof.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 4th embodiment are shown in Table 4A and the aspheric surface data are shown in Table 4B below.

TABLE 4A

4th Embodiment
f = 3.73 mm, FNO = 1.48, HFOV = 54.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 27.0400 | (SPH) | 1.000 | Glass | 1.620 | 60.3 | −5.93 |
| 2 | | 3.1900 | (SPH) | 2.478 | | | | |
| 3 | Lens 2 | 9.8900 | (ASP) | 1.442 | Plastic | 1.686 | 18.4 | 37.65 |
| 4 | | 15.0700 | (ASP) | 1.353 | | | | |

TABLE 4A-continued

4th Embodiment
f = 3.73 mm, FNO = 1.48, HFOV = 54.0 deg.

| Surface # | | Curvature Radius | | Thickness | Material | Index | Abbe # | Focal Length |
|---|---|---|---|---|---|---|---|---|
| 5 | Lens 3 | −5.0300 | (SPH) | 1.252 | Glass | 1.804 | 46.6 | 43.09 |
| 6 | | −4.8800 | (SPH) | 0.236 | | | | |
| 7 | Ape. Stop | Plano | | −0.136 | | | | |
| 8 | Lens 4 | 11.6700 | (SPH) | 2.161 | Glass | 1.804 | 46.6 | 5.74 |
| 9 | | −7.0000 | (SPH) | 0.250 | | | | |
| 10 | Lens 5 | −11.0700 | (SPH) | 0.600 | Glass | 1.923 | 18.9 | −8.21 |
| 11 | | 24.6500 | (SPH) | 0.100 | | | | |
| 12 | Lens 6 | 6.6700 | (SPH) | 2.217 | Glass | 1.729 | 54.7 | 6.80 |
| 13 | | −16.5500 | (SPH) | 0.050 | | | | |
| 14 | Lens 7 | 18.1300 | (ASP) | 0.600 | Plastic | 1.534 | 56.0 | −94.46 |
| 15 | | 13.1900 | (ASP) | 1.198 | | | | |
| 16 | Lens 8 | −14.6500 | (ASP) | 0.650 | Plastic | 1.639 | 23.5 | −37.60 |
| 17 | | −38.2100 | (ASP) | 1.000 | | | | |
| 18 | Filter | Plano | | 0.500 | Glass | 1.517 | 64.2 | — |
| 19 | | Plano | | 1.852 | | | | |
| 20 | Image | Plano | | — | | | | |

Note:
Reference wavelength is 587.6 nm (d-line).

TABLE 4B

Aspheric Coefficients

| Surface # | 3 | 4 | 14 | 15 |
|---|---|---|---|---|
| k= | 2.93287000E+00 | 2.40033000E+01 | −4.74574000E−01 | −2.97009000E+01 |
| A4= | 1.72057680E−03 | 3.69232800E−03 | 2.36986290E−03 | 2.65167930E−03 |
| A6= | 1.86346570E−05 | 2.01260250E−04 | −1.83996810E−04 | −3.53307020E−04 |
| A8= | 3.26239220E−05 | 6.60309440E−06 | 8.12563700E−05 | 1.07790270E−04 |
| A10= | −6.22961470E−06 | 2.65859340E−06 | −8.60988670E−06 | −4.87933680E−06 |
| A12= | 4.71276480E−07 | −6.96907210E−07 | 2.21453080E−07 | −3.13045400E−07 |
| A14= | −1.35119120E−08 | 1.18937620E−08 | — | — |

| Surface # | 16 | 17 |
|---|---|---|
| k= | 1.98974000E+01 | 6.96791000E+01 |
| A4= | −1.19745690E−02 | −5.89205560E−03 |
| A6= | −3.36462510E−04 | −2.14192150E−04 |
| A8= | 2.96691160E−04 | 3.61658690E−04 |
| A10= | −5.36881560E−06 | −4.49563720E−05 |
| A12= | −3.21271560E−06 | 2.61547900E−06 |
| A14= | 1.99212970E−07 | −7.32061160E−08 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Schematic Parameters

| f [mm] | 3.73 | f/f456 | 0.70 |
|---|---|---|---|
| FNO | 1.48 | f/f5 | −0.45 |
| HFOV [deg.] | 54.0 | f/f6 | 0.55 |
| (CT4 + T45 + CT5)/TD | 0.19 | f/f78 | −0.14 |
| (R1 + R2)/(R1 − R2) | 1.27 | f/R5 | −0.74 |
| (R3 + R4)/(R3 − R4) | −4.82 | (N4 + N5)/2 | 1.863 |
| (R7 + R10)/(R7 − R10) | −2.80 | N6 | 1.729 |
| (R11 + R12)/(R11 − R12) | −0.43 | N8 | 1.639 |

TABLE 4C-continued

Schematic Parameters

| (R15 + R16)/(R15 − R16) | −2.24 | T12/f | 0.66 |
|---|---|---|---|
| CT1/f | 0.27 | T12/TD | 0.16 |
| CT3/f | 0.34 | V4 | 46.6 |
| CT6/f | 0.59 | V8 | 23.5 |
| CT3/ΣCT | 0.13 | ΣAT/T56 | 55.29 |
| f/f45 | 0.26 | ΣAT/TD | 0.36 |

5th Embodiment

Figure 9:
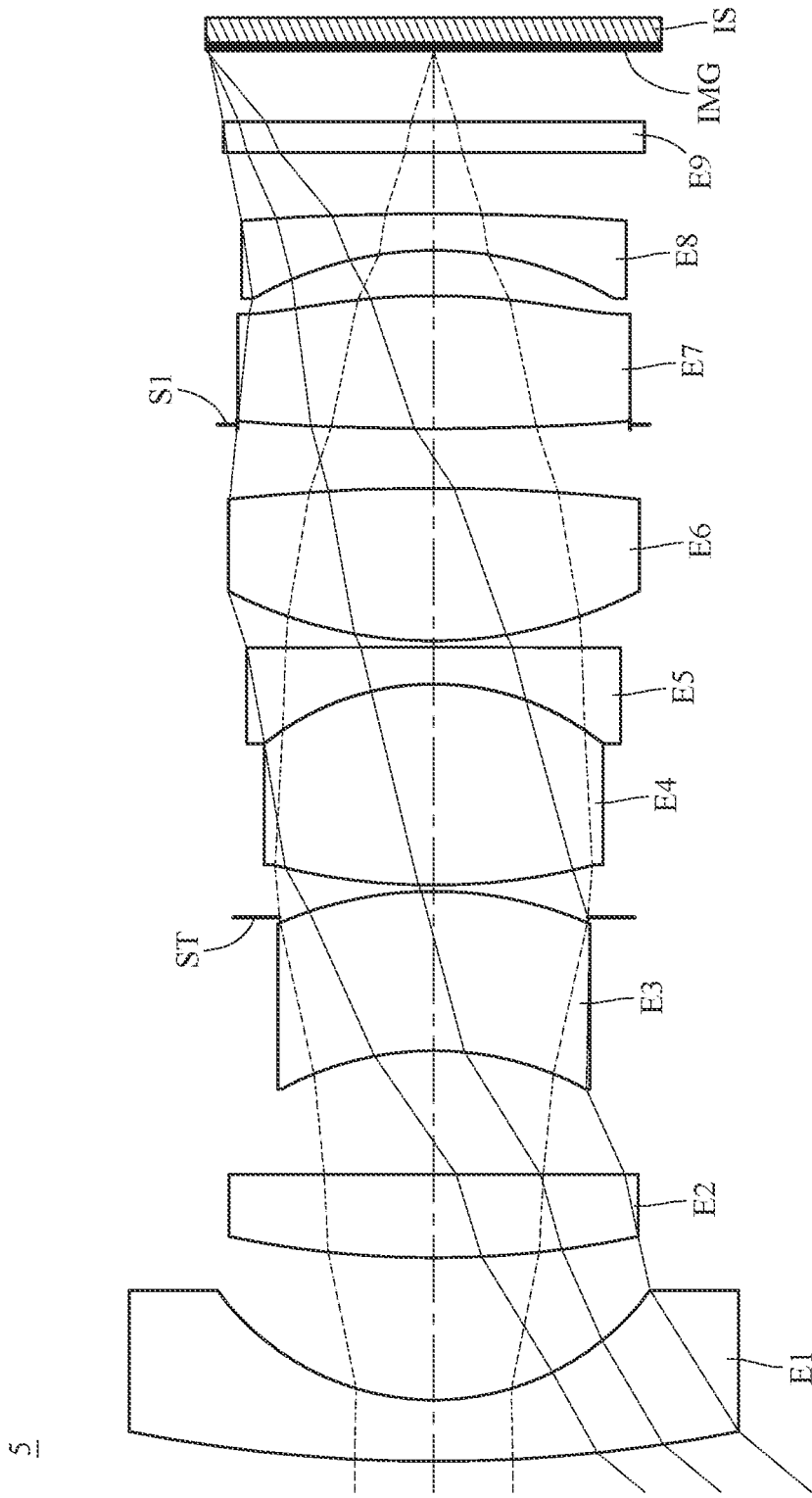
FIG. 9 is a schematic view of an image capturing unit according to the 5th embodiment of the present disclosure.
Figure 10:
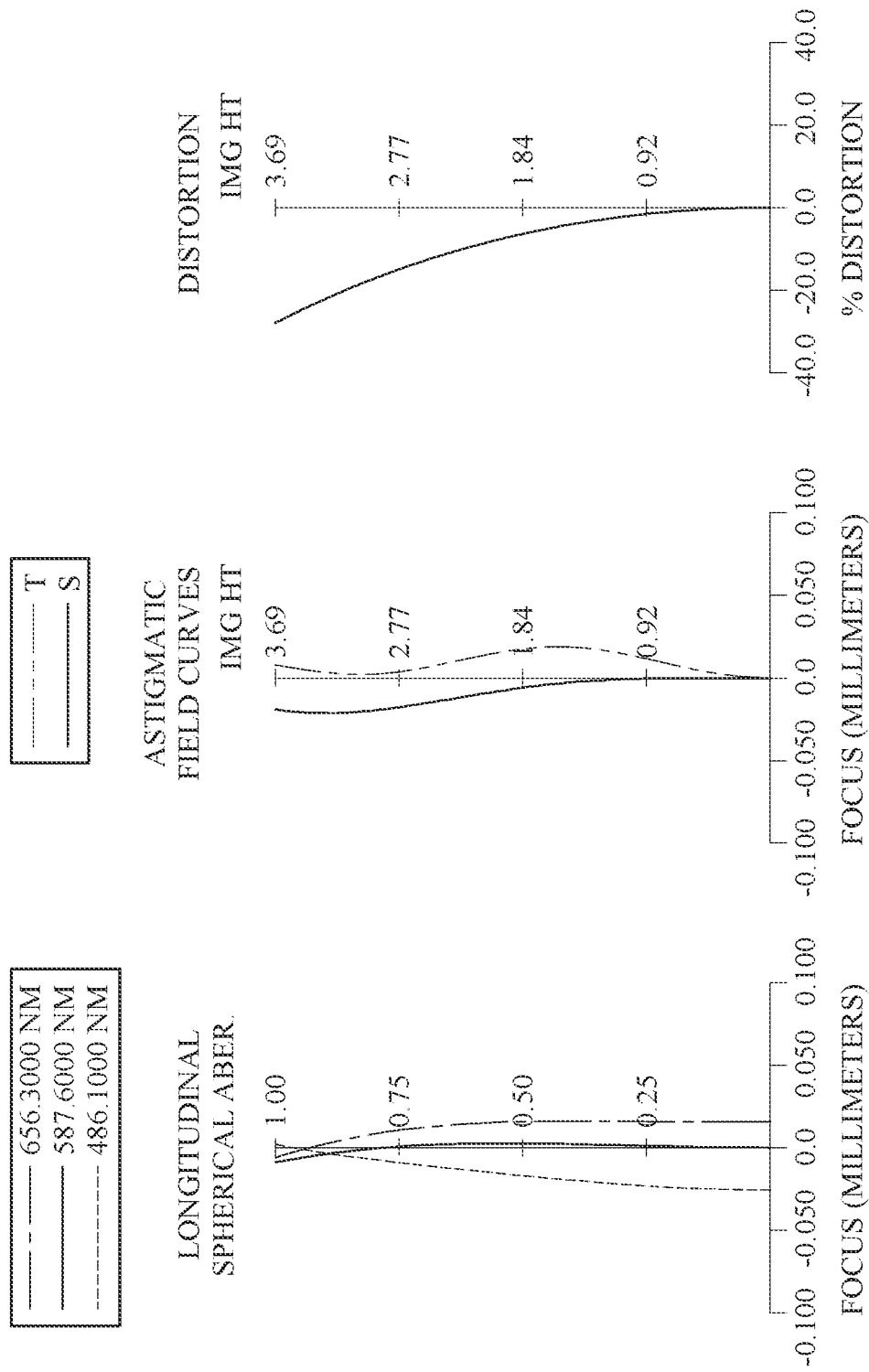
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a stop S1, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being planar in a paraxial region thereof. The second lens element E2 is made of glass material and has the object-side surface being spherical.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being convex in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with positive refractive power has an object-side surface being convex in a paraxial region thereof and an image-side surface being convex in a paraxial region thereof. The seventh lens element E7 is made of glass material and has the object-side surface and the image-side surface being both aspheric. The image-side surface of the seventh lens element E7 has one inflection point.

The eighth lens element E8 with negative refractive power has an object-side surface being concave in a paraxial region thereof and an image-side surface being convex in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 5th embodiment are shown in Table 5A and the aspheric surface data are shown in Table 5B below.

TABLE 5A

5th Embodiment
f = 4.26 mm, FNO = 1.65, HFOV = 50.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 25.6600 (SPH) | 1.000 | Glass | 1.772 | 49.6 | −6.97 |
| 2 | | 4.3800 (SPH) | 2.320 | | | | |
| 3 | Lens 2 | 16.2300 (SPH) | 1.360 | Glass | 1.923 | 18.9 | 17.59 |
| 4 | | Plano | 2.020 | | | | |
| 5 | Lens 3 | −5.2200 (SPH) | 2.600 | Glass | 1.729 | 54.7 | −583.09 |
| 6 | | −6.4000 (SPH) | −0.430 | | | | |
| 7 | Ape. Stop | Plano | 0.530 | | | | |
| 8 | Lens 4 | 10.6300 (SPH) | 3.280 | Glass | 1.717 | 47.9 | 4.78 |
| 9 | | −4.4000 (SPH) | 0.005 | Cemented | 1.514 | 38.8 | — |
| 10 | Lens 5 | −4.4000 (SPH) | 0.600 | Glass | 1.762 | 26.5 | −5.87 |
| 11 | | −312.5000 (SPH) | 0.100 | | | | |
| 12 | Lens 6 | 7.3200 (SPH) | 2.490 | Glass | 1.618 | 63.3 | 9.82 |
| 13 | | −30.9800 (SPH) | 1.040 | | | | |
| 14 | Stop | Plano | −0.070 | | | | |
| 15 | Lens 7 | 34.9000 (ASP) | 2.170 | Glass | 1.693 | 53.2 | 12.19 |
| 16 | | −10.8700 (ASP) | 0.740 | | | | |
| 17 | Lens 8 | −5.9200 (SPH) | 0.600 | Glass | 1.834 | 37.2 | −8.29 |
| 18 | | −43.0500 (SPH) | 1.000 | | | | |
| 19 | Filter | Plano | 0.500 | Glass | 1.517 | 64.2 | — |
| 20 | | Plano | 1.159 | | | | |
| 21 | Image | Plano | — | | | | |

Note:
Reference wavelength is 587.6 nm (d-line).
An effective radius of the stop S1 (Surface 14) is 3.200 mm.

TABLE 5B

| Aspheric Coefficients | | |
| --- | --- | --- |
| Surface # | 15 | 16 |
| k= | 9.00000000E+01 | −7.27315000E+00 |
| A4= | −1.01964570E−03 | 2.26689130E−04 |
| A6= | 5.58712660E−05 | 3.56402400E−06 |
| A8= | −4.97705730E−06 | 1.00490490E−05 |
| A10= | 6.07644760E−07 | −2.67406560E−07 |
| A12= | −3.00025860E−08 | 4.47288450E−09 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | | | |
| --- | --- | --- | --- |
| f [mm] | 4.26 | f/f456 | 0.62 |
| FNO | 1.65 | f/f5 | −0.73 |
| HFOV [deg.] | 50.2 | f/f6 | 0.43 |
| (CT4 + T45 + CT5)/TD | 0.19 | f/f78 | −0.12 |
| (R1 + R2)/(R1 − R2) | 1.41 | f/R5 | −0.82 |
| (R3 + R4)/(R3 − R4) | −1.00 | (N4 + N5)/2 | 1.739 |
| (R7 + R10)/(R7 − R10) | −0.93 | N6 | 1.618 |
| (R11 + R12)/(R11 − R12) | −0.62 | N8 | 1.834 |
| (R15 + R16)/(R15 − R16) | −1.32 | T12/f | 0.55 |
| CT1/f | 0.23 | T12/TD | 0.11 |
| CT3/f | 0.61 | V4 | 47.9 |
| CT6/f | 0.59 | V8 | 37.2 |
| CT3/ΣCT | 0.18 | ΣAT/T56 | 62.55 |
| f/f45 | 0.26 | ΣAT/TD | 0.31 |

6th Embodiment

Figure 11:
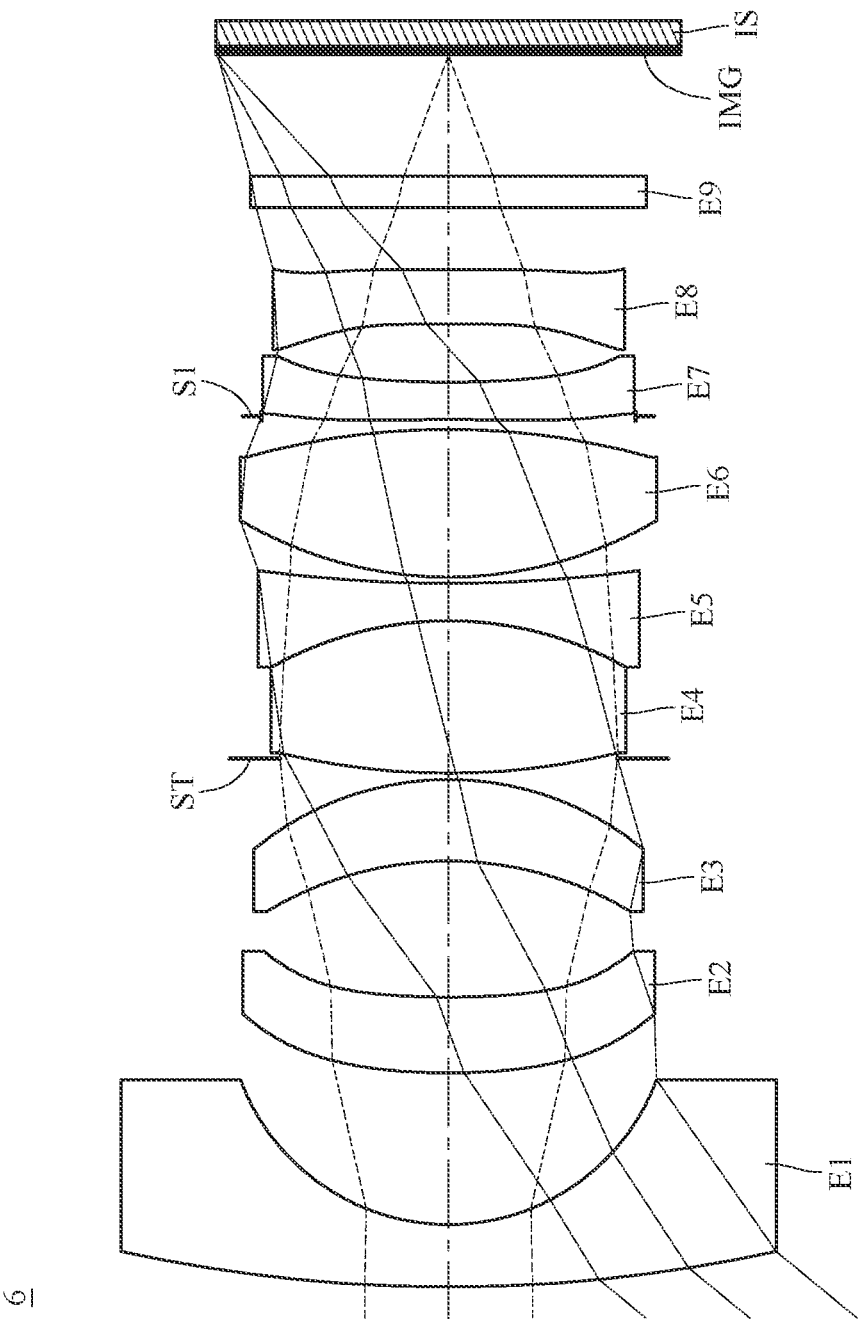
FIG. 11 is a schematic view of an image capturing unit according to the 6th embodiment of the present disclosure.
Figure 12:
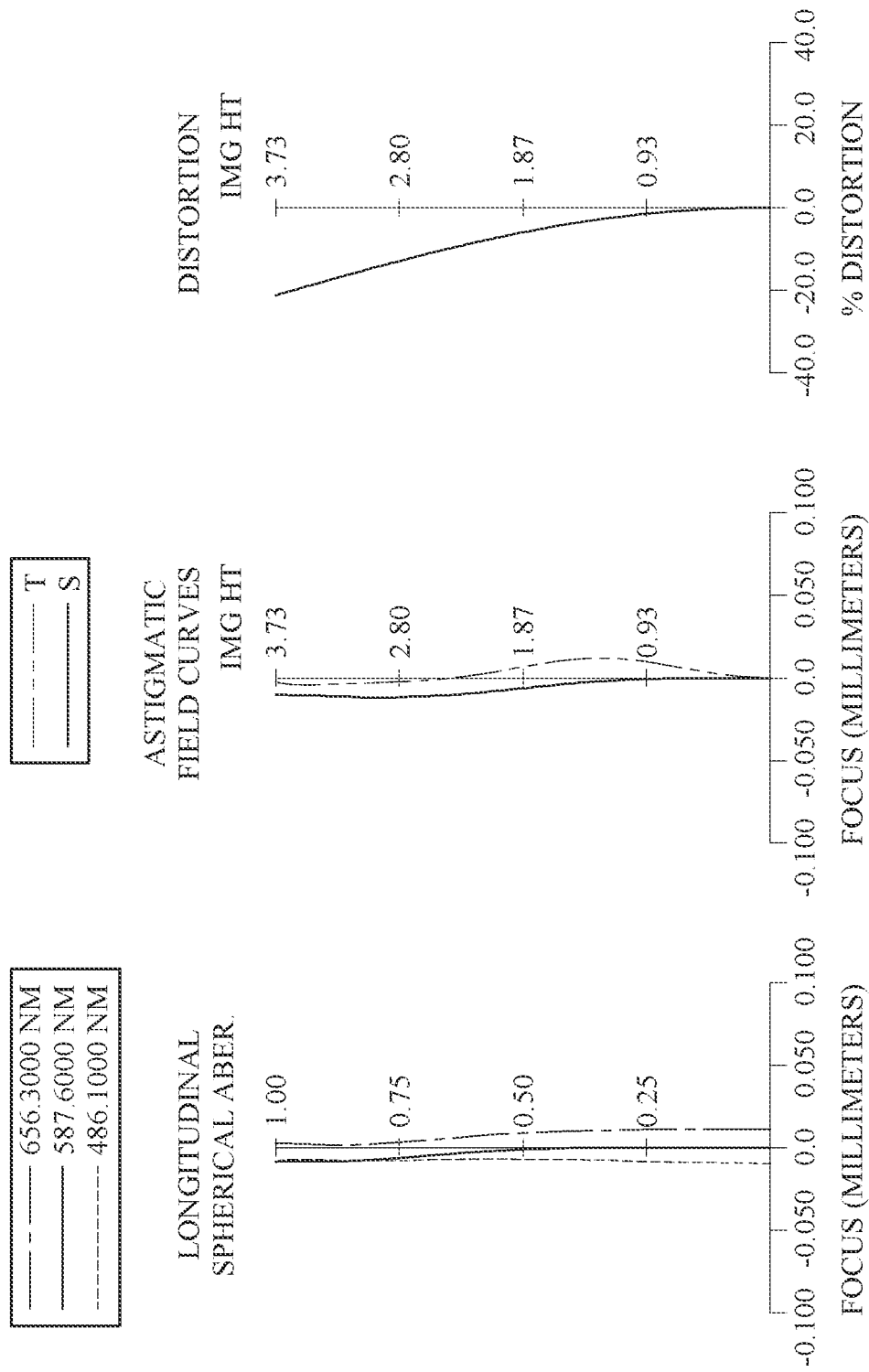
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a stop S1, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being concave in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The object-side surface of the seventh lens element E7 has one critical point in an off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric. The object-side surface of the eighth lens element E8 has one inflection point. The image-side surface of the eighth lens element E8 has two inflection points. The image-side surface of the eighth lens element E8 has two critical points in an off-axis region thereof.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 6th embodiment are shown in Table 6A and the aspheric surface data are shown in Table 6B below.

TABLE 6A

6th Embodiment
f = 3.91 mm, FNO = 1.45, HFOV = 50.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 24.5200 (SPH) | 1.000 | Glass | 1.618 | 63.4 | −6.87 |
| 2 | | 3.5600 (SPH) | 2.438 | | | | |
| 3 | Lens 2 | 10.4300 (ASP) | 1.220 | Plastic | 1.686 | 18.4 | 41.81 |
| 4 | | 15.6200 (ASP) | 2.186 | | | | |
| 5 | Lens 3 | −5.6500 (SPH) | 1.311 | Glass | 1.788 | 47.4 | 26.82 |
| 6 | | −4.9200 (SPH) | 0.339 | | | | |
| 7 | Ape. Stop | Plano | −0.239 | | | | |
| 8 | Lens 4 | 11.4700 (SPH) | 2.447 | Glass | 1.804 | 46.5 | 5.11 |
| 9 | | −5.8000 (SPH) | 0.005 | Cemented | 1.550 | 43.9 | — |
| 10 | Lens 5 | −5.8000 (SPH) | 0.600 | Glass | 1.740 | 28.3 | −6.20 |
| 11 | | 22.8300 (SPH) | 0.100 | | | | |
| 12 | Lens 6 | 6.5900 (SPH) | 2.374 | Glass | 1.747 | 51.0 | 6.02 |
| 13 | | −12.0000 (SPH) | 0.205 | | | | |
| 14 | Stop | Plano | −0.047 | | | | |
| 15 | Lens 7 | −43.5500 (ASP) | 0.600 | Plastic | 1.680 | 18.2 | −17.48 |
| 16 | | 16.4400 (ASP) | 0.936 | | | | |
| 17 | Lens 8 | −219.0600 (ASP) | 0.874 | Plastic | 1.660 | 20.4 | −101.56 |
| 18 | | 96.7300 (ASP) | 1.000 | | | | |
| 19 | Filter | Plano | 0.500 | Glass | 1.517 | 64.2 | — |
| 20 | | Plano | 1.956 | | | | |
| 21 | Image | Plano | — | | | | |

Note:
Reference wavelength is 587.6 nm (d-line).
An effective radius of the stop S1 (Surface 14) is 3.001 mm.

TABLE 6B

Aspheric Coefficients

| Surface # | 3 | 4 | 15 | 16 |
|---|---|---|---|---|
| k= | 4.59657000E+00 | 2.33371000E+01 | −9.00000000E+01 | 2.32069000E+01 |
| A4= | 1.80056950E−03 | 3.30860940E−03 | 2.88569360E−03 | −1.72576980E−04 |
| A6= | 1.10309600E−04 | 1.40983520E−04 | 1.12600690E−04 | 4.09865420E−04 |
| A8= | −1.68054180E−06 | 1.61387620E−05 | −9.54492060E−06 | −1.75806130E−05 |
| A10= | 2.16910170E−07 | −3.13074760E−06 | −6.80229270E−07 | 4.90638760E−06 |
| A12= | −1.77615880E−08 | 5.13704870E−07 | −3.94420260E−08 | −5.55241220E−07 |
| A14= | −9.59516560E−10 | −5.03667010E−08 | — | — |

| Surface # | 17 | 18 |
|---|---|---|
| k= | 9.00000000E+01 | −4.96440000E+01 |
| A4= | −1.37929960E−02 | −6.43413080E−03 |
| A6= | 8.85101230E−05 | 6.34277830E−05 |
| A8= | 1.70055250E−04 | 2.25358890E−04 |
| A10= | 8.61980880E−06 | −2.49252930E−05 |
| A12= | −3.90437330E−06 | 1.06457350E−06 |
| A14= | 2.22617700E−07 | −1.64053140E−08 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Schematic Parameters

| | | | |
|---|---|---|---|
| f [mm] | 3.91 | f/f456 | 0.75 |
| FNO | 1.45 | f/f5 | −0.63 |
| HFOV [deg.] | 50.5 | f/f6 | 0.65 |
| (CT4 + T45 + CT5)/TD | 0.19 | f/f78 | −0.27 |
| (R1 + R2)/(R1 − R2) | 1.34 | f/R5 | −0.69 |
| (R3 + R4)/(R3 − R4) | −5.02 | (N4 + N5)/2 | 1.772 |
| (R7 + R10)/(R7 − R10) | −3.02 | N6 | 1.747 |

TABLE 6C-continued

Schematic Parameters

| | | | |
|---|---|---|---|
| (R11 + R12)/(R11 − R12) | −0.29 | N8 | 1.660 |
| (R15 + R16)/(R15 − R16) | 0.39 | T12/f | 0.62 |
| CT1/f | 0.26 | T12/TD | 0.15 |
| CT3/f | 0.34 | V4 | 46.5 |
| CT6/f | 0.61 | V8 | 20.4 |
| CT3/ΣCT | 0.13 | ΣAT/T56 | 59.23 |
| f/f45 | 0.20 | ΣAT/TD | 0.36 |

7th Embodiment

Figure 13:
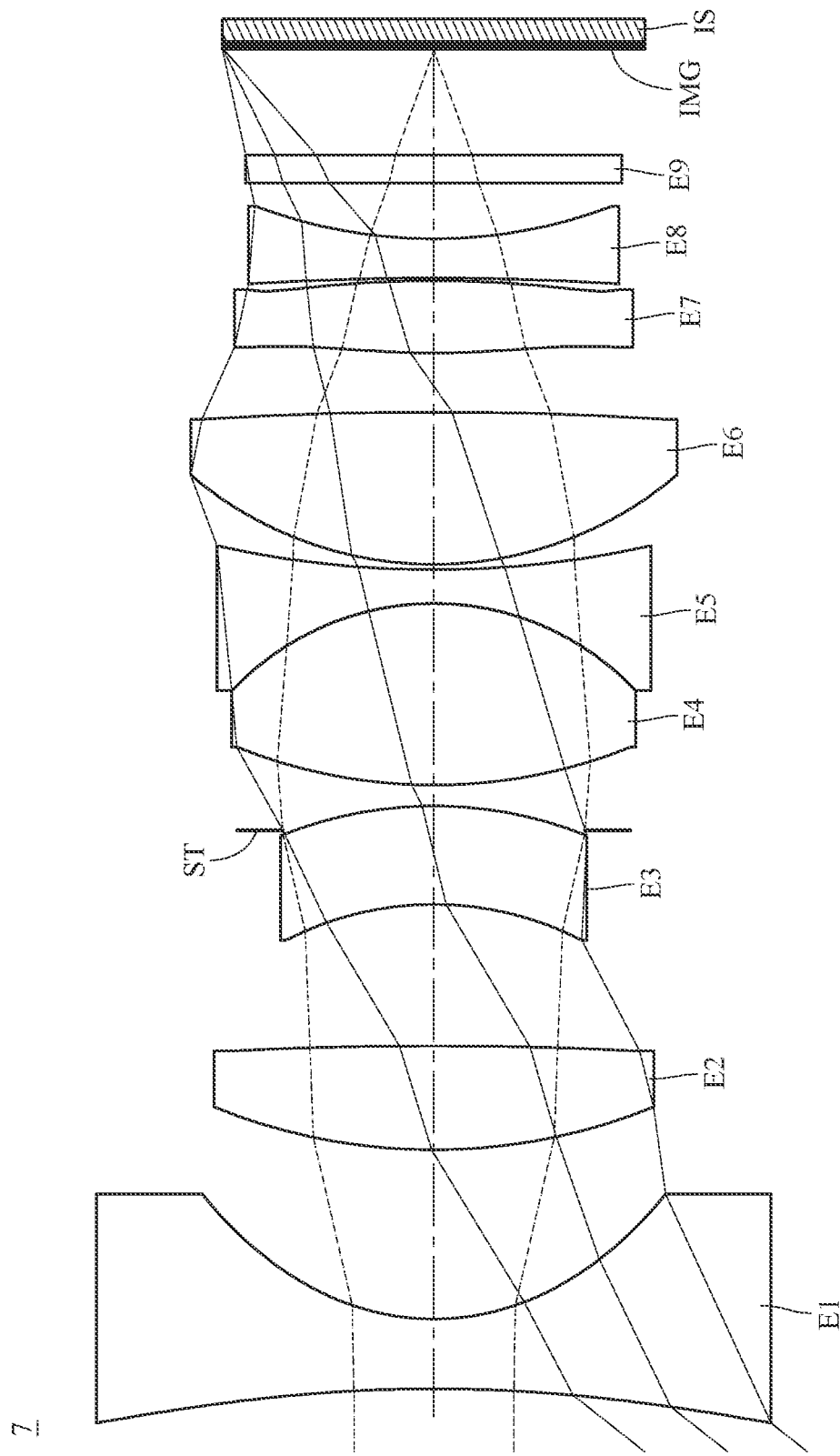
FIG. 13 is a schematic view of an image capturing unit according to the 7th embodiment of the present disclosure.
Figure 14:
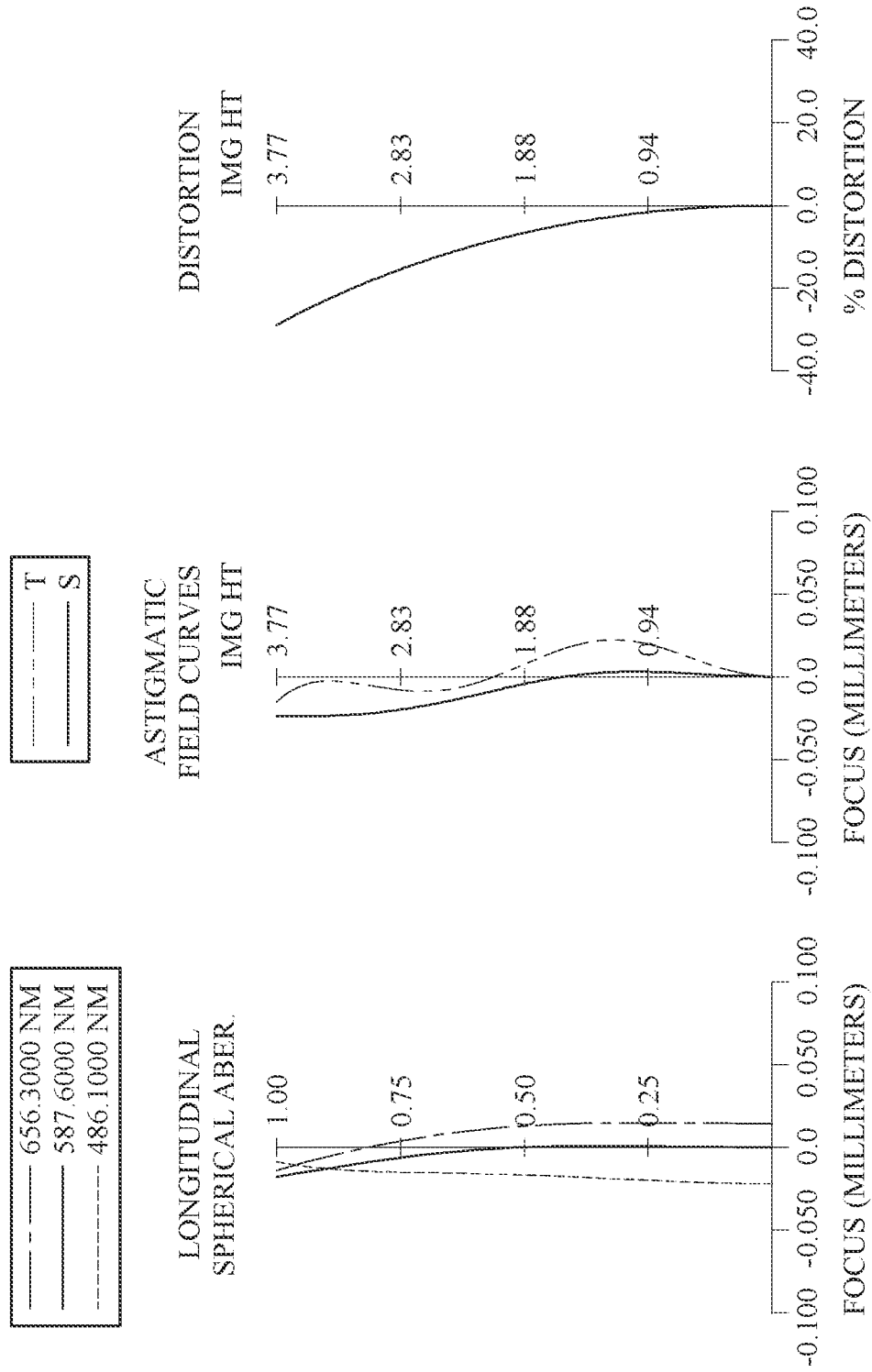
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical.

The fifth lens element E5 with negative refractive power has an object-side surface being concave in a paraxial region thereof and an image-side surface being concave in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with positive refractive power has an object-side surface being convex in a paraxial region thereof and an image-side surface being convex in a paraxial region thereof. The seventh lens element E7 is made of glass material and has the object-side surface and the image-side surface being both aspheric. The object-side surface of the seventh lens element E7 has three inflection points. The image-side surface of the seventh lens element E7 has one inflection point. The object-side surface of the seventh lens element E7 has two critical points in an off-axis region thereof. The image-side surface of the seventh lens element E7 has one critical point in an off-axis region thereof.

The eighth lens element E8 with negative refractive power has an object-side surface being concave in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 7th embodiment are shown in Table 7A and the aspheric surface data are shown in Table 7B below.

TABLE 7A

7th Embodiment
f = 4.18 mm, FNO = 1.46, HFOV = 51.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −26.5900 | (ASP) | 1.250 | Plastic | 1.545 | 56.1 | −6.80 |
| 2 | | 4.3800 | (ASP) | 3.032 | | | | |
| 3 | Lens 2 | 10.4500 | (SPH) | 1.865 | Glass | 1.740 | 28.3 | 12.44 |
| 4 | | −71.5100 | (SPH) | 2.537 | | | | |
| 5 | Lens 3 | −5.7600 | (SPH) | 1.762 | Glass | 1.959 | 17.5 | −61.58 |
| 6 | | −7.3300 | (SPH) | −0.435 | | | | |
| 7 | Ape. Stop | Plano | | 0.808 | | | | |
| 8 | Lens 4 | 9.4400 | (SPH) | 3.254 | Glass | 1.697 | 56.2 | 5.14 |
| 9 | | −4.9600 | (SPH) | 0.005 | Cemented | 1.550 | 43.9 | — |
| 10 | Lens 5 | −4.9600 | (SPH) | 0.600 | Glass | 1.717 | 29.5 | −5.35 |
| 11 | | 17.7600 | (SPH) | 0.100 | | | | |
| 12 | Lens 6 | 6.7300 | (SPH) | 2.729 | Glass | 1.804 | 46.6 | 7.74 |
| 13 | | −66.9600 | (SPH) | 1.058 | | | | |

TABLE 7A-continued

7th Embodiment
f = 4.18 mm, FNO = 1.46, HFOV = 51.7 deg.

| Surface # | | Curvature Radius | | Thickness | Material | Index | Abbe # | Focal Length |
|---|---|---|---|---|---|---|---|---|
| 14 | Lens 7 | 14.8700 | (ASP) | 1.295 | Glass | 1.923 | 20.9 | 9.42 |
| 15 | | −20.0300 | (ASP) | 0.050 | | | | |
| 16 | Lens 8 | −51.4000 | (SPH) | 0.700 | Glass | 1.959 | 17.5 | −7.94 |
| 17 | | 9.0000 | (SPH) | 1.000 | | | | |
| 18 | Filter | Plano | | 0.500 | Glass | 1.517 | 64.2 | — |
| 19 | | Plano | | 1.895 | | | | |
| 20 | Image | Plano | | — | | | | |

Note:
Reference wavelength is 587.6 nm (d-line).

TABLE 7B

Aspheric Coefficients

| Surface # | 1 | 2 | 14 | 15 |
|---|---|---|---|---|
| k= | 0.00000000E+00 | −3.35083000E−01 | −4.20659000E+01 | 2.68896000E+01 |
| A4= | 1.65798930E−05 | −1.23401040E−04 | −6.69196150E−04 | 6.51459160E−04 |
| A6= | 4.80796230E−06 | −4.29331740E−05 | −1.36295370E−04 | −8.15046440E−05 |
| A8= | −2.29875590E−07 | 5.48564570E−06 | −1.03339310E−05 | 1.11262800E−05 |
| A10= | 5.28936370E−09 | −5.06838180E−07 | 2.61824180E−06 | 3.02939960E−07 |
| A12= | −4.43064210E−11 | 2.02319710E−08 | −9.62541490E−08 | 1.45253300E−08 |
| A14= | −4.70355930E−14 | −3.37259280E−10 | — | — |
| A16= | 3.57549420E−17 | — | — | — |

In the 7th embodiment, the equation of the aspheric surface profiles of the aforementioned lens elements is the same as the equation of the 1st embodiment. Also, the definitions of these parameters shown in Table 7C are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

Schematic Parameters

| f [mm] | 4.18 | f/f456 | 0.60 |
|---|---|---|---|
| FNO | 1.46 | f/f5 | 0.78 |
| HFOV [deg.] | 51.7 | f/f6 | 0.54 |
| (CT4 + T45 + CT5)/TD | 0.19 | f/f78 | −0.04 |
| (R1 + R2)/(R1 − R2) | 0.72 | f/R5 | −0.73 |
| (R3 + R4)/(R3 − R4) | −0.74 | (N4 + N5)/2 | 1.707 |
| (R7 + R10)/(R7 − R10) | −3.27 | N6 | 1.804 |
| (R11 + R12)/(R11 − R12) | −0.82 | N8 | 1.959 |
| (R15 + R16)/(R15 − R16) | 0.70 | T12/f | 0.72 |
| CT1/f | 0.30 | T12/TD | 0.15 |
| CT3/f | 0.42 | V4 | 56.2 |
| CT6/f | 0.65 | V8 | 17.5 |
| CT3/ΣCT | 0.13 | ΣAT/T56 | 71.55 |
| f/f45 | 0.15 | ΣAT/TD | 0.35 |

8th Embodiment

Figure 15:
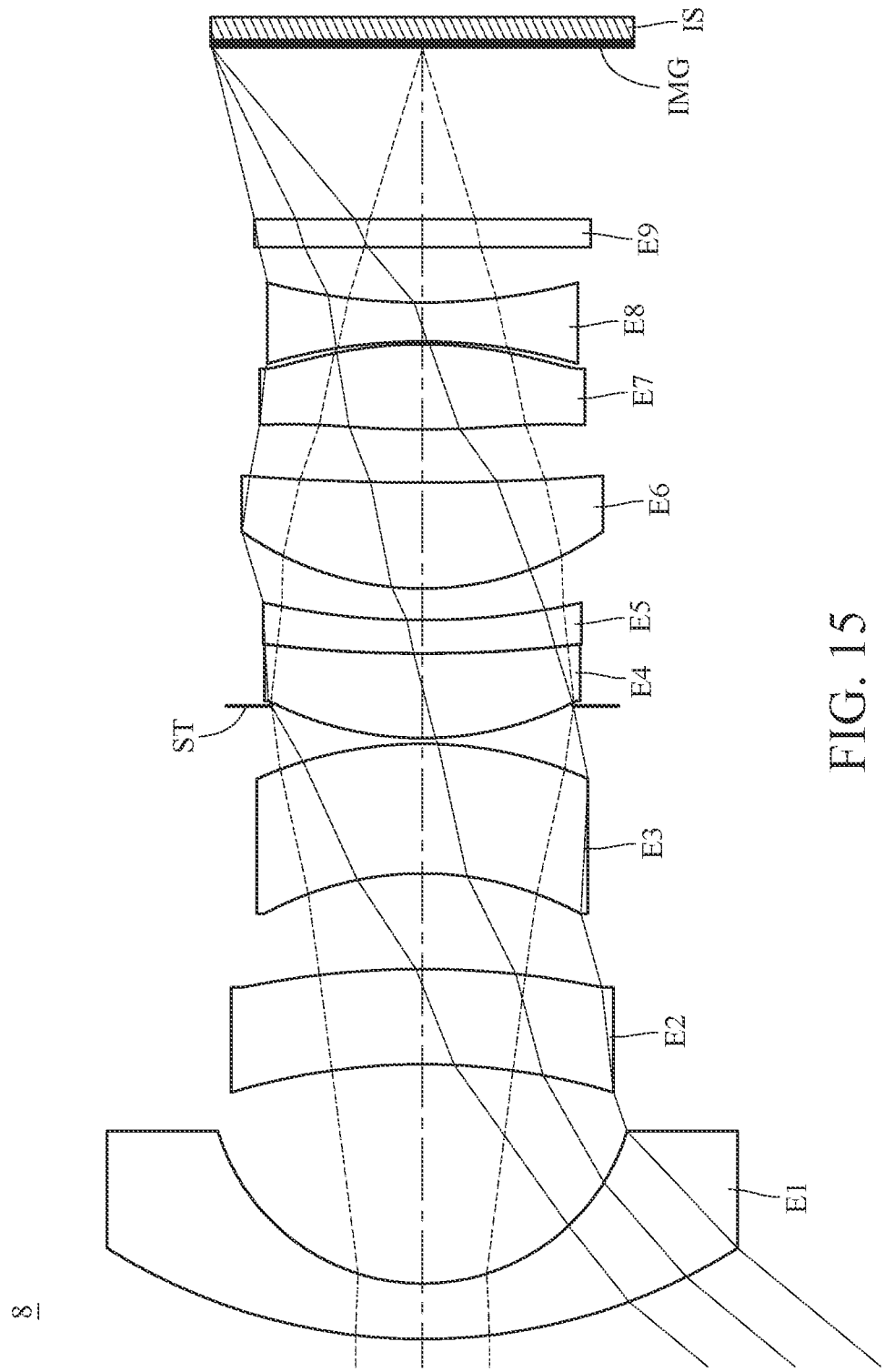
FIG. 15 is a schematic view of an image capturing unit according to the 8th embodiment of the present disclosure.
Figure 16:
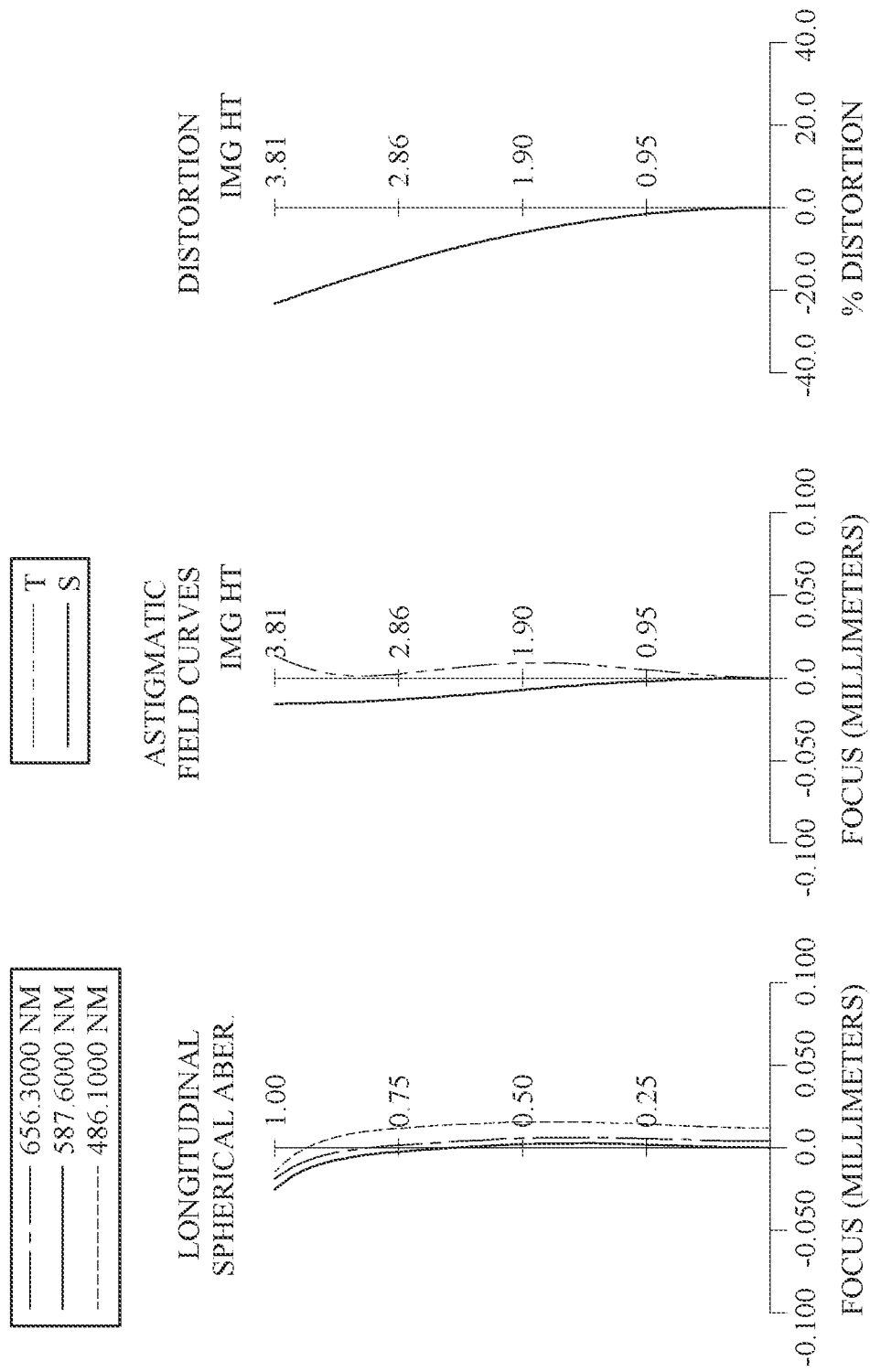
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the imaging lens system (its reference numeral is omitted) of the present disclosure and an image sensor IS. The imaging lens system includes, in order from an object side to an image side along an optical axis, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG. The imaging lens system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being concave in a paraxial region thereof. The fourth lens element E4 is made of glass material and has the object-side surface and the image-side surface being both spherical.

The fifth lens element E5 with negative refractive power has an object-side surface being convex in a paraxial region thereof and an image-side surface being concave in a paraxial region thereof. The fifth lens element E5 is made of glass material and has the object-side surface and the image-side surface being both spherical. The object-side surface of the fifth lens element E5 is cemented to the image-side surface of the fourth lens element E4.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both spherical.

The seventh lens element E7 with positive refractive power has an object-side surface being convex in a paraxial region thereof and an image-side surface being convex in a paraxial region thereof. The seventh lens element E7 is made of glass material and has the object-side surface and the image-side surface being both aspheric. The object-side surface of the seventh lens element E7 has two inflection points. The image-side surface of the seventh lens element E7 has one inflection point. The object-side surface of the seventh lens element E7 has one critical point in an off-axis region thereof.

The eighth lens element E8 with negative refractive power has an object-side surface being concave in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the imaging lens system. The image sensor IS is disposed on or near the image surface IMG of the imaging lens system.

The detailed optical data of the 8th embodiment are shown in Table 8A and the aspheric surface data are shown in Table 8B below.

TABLE 8B

| Aspheric Coefficients | | |
| --- | --- | --- |
| Surface # | 14 | 15 |
| k= | −2.42386000E+01 | −1.96698000E+00 |
| A4= | −1.83964800E−03 | 2.73974000E−04 |
| A6= | −5.62566260E−05 | −2.90122430E−05 |
| A8= | −3.45139960E−05 | −4.90145340E−06 |
| A10= | 6.58181130E−06 | 2.96949180E−06 |
| A12= | −2.62436500E−07 | −6.07121460E−08 |

In the 8th embodiment, the equation of the aspheric surface profiles of the aforementioned lens elements is the same as the equation of the 1st embodiment. Also, the definitions of these parameters shown in Table 8C are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Schematic Parameters | | | |
| --- | --- | --- | --- |
| f [mm] | 4.11 | f/f456 | 0.61 |
| FNO | 1.70 | f/f5 | −0.13 |
| HFOV [deg.] | 50.4 | f/f6 | 0.47 |
| (CT4 + T45 + CT5)/TD | 0.11 | f/f78 | 0.00 |
| (R1 + R2)/(R1 − R2) | 2.13 | f/R5 | −0.69 |
| (R3 + R4)/(R3 − R4) | −6.78 | (N4 + N5)/2 | 1.789 |
| (R7 + R10)/(R7 − R10) | −2.67 | N6 | 1.729 |
| (R11 + R12)/(R11 − R12) | −1.31 | N8 | 1.946 |
| (R15 + R16)/(R15 − R16) | −0.05 | T12/f | 0.96 |
| CT1/f | 0.24 | T12/TD | 0.21 |
| CT3/f | 0.57 | V4 | 63.3 |
| CT6/f | 0.47 | V8 | 17.9 |
| CT3/ΣCT | 0.21 | ΣAT/T56 | 12.95 |
| f/f45 | 0.22 | ΣAT/TD | 0.39 |

TABLE 8A

| 8th Embodiment f = 4.11 mm, FNO = 1.70, HFOV = 50.4 deg. | | | | | | | |
| --- | --- | --- | --- | --- | --- | --- | --- |
| Surface # | | Curvature Radius | | Thickness | Material | Index | Abbe # | Focal Length |
| 0 | Object | Plano | | Infinity | | | | |
| 1 | Lens 1 | 10.6600 | (SPH) | 1.000 | Glass | 1.618 | 63.3 | −10.32 |
| 2 | | 3.8500 | (SPH) | 3.959 | | | | |
| 3 | Lens 2 | −11.9300 | (SPH) | 1.717 | Glass | 1.487 | 70.2 | −110.30 |
| 4 | | −16.0500 | (SPH) | 1.724 | | | | |
| 5 | Lens 3 | −5.9600 | (SPH) | 2.341 | Glass | 1.618 | 63.3 | −140.73 |
| 6 | | −7.3600 | (SPH) | 0.678 | | | | |
| 7 | Ape. Stop | Plano | | −0.578 | | | | |
| 8 | Lens 4 | 6.0300 | (SPH) | 1.524 | Glass | 1.618 | 63.3 | 12.63 |
| 9 | | 23.9500 | (SPH) | 0.005 | Cemented | 1.514 | 38.8 | — |
| 10 | Lens 5 | 23.9500 | (SPH) | 0.600 | Glass | 1.959 | 17.5 | −31.88 |
| 11 | | 13.2600 | (SPH) | 0.569 | | | | |
| 12 | Lens 6 | 5.6600 | (SPH) | 1.912 | Plastic | 1.729 | 54.7 | 8.78 |
| 13 | | 42.1200 | (SPH) | 0.959 | | | | |
| 14 | Lens 7 | 14.4800 | (ASP) | 1.540 | Glass | 1.850 | 30.0 | 6.03 |
| 15 | | −7.5600 | (ASP) | 0.050 | | | | |
| 16 | Lens 8 | −10.0100 | (SPH) | 0.700 | Glass | 1.946 | 17.9 | −5.49 |
| 17 | | 11.1600 | (SPH) | 1.000 | | | | |
| 18 | Filter | Plano | | 0.500 | Glass | 1.517 | 64.2 | — |
| 19 | | Plano | | 3.102 | | | | |
| 20 | Image | Plano | | — | | | | |

Note:
Reference wavelength is 587.6 nm (d-line).

9th Embodiment

Figure 17:
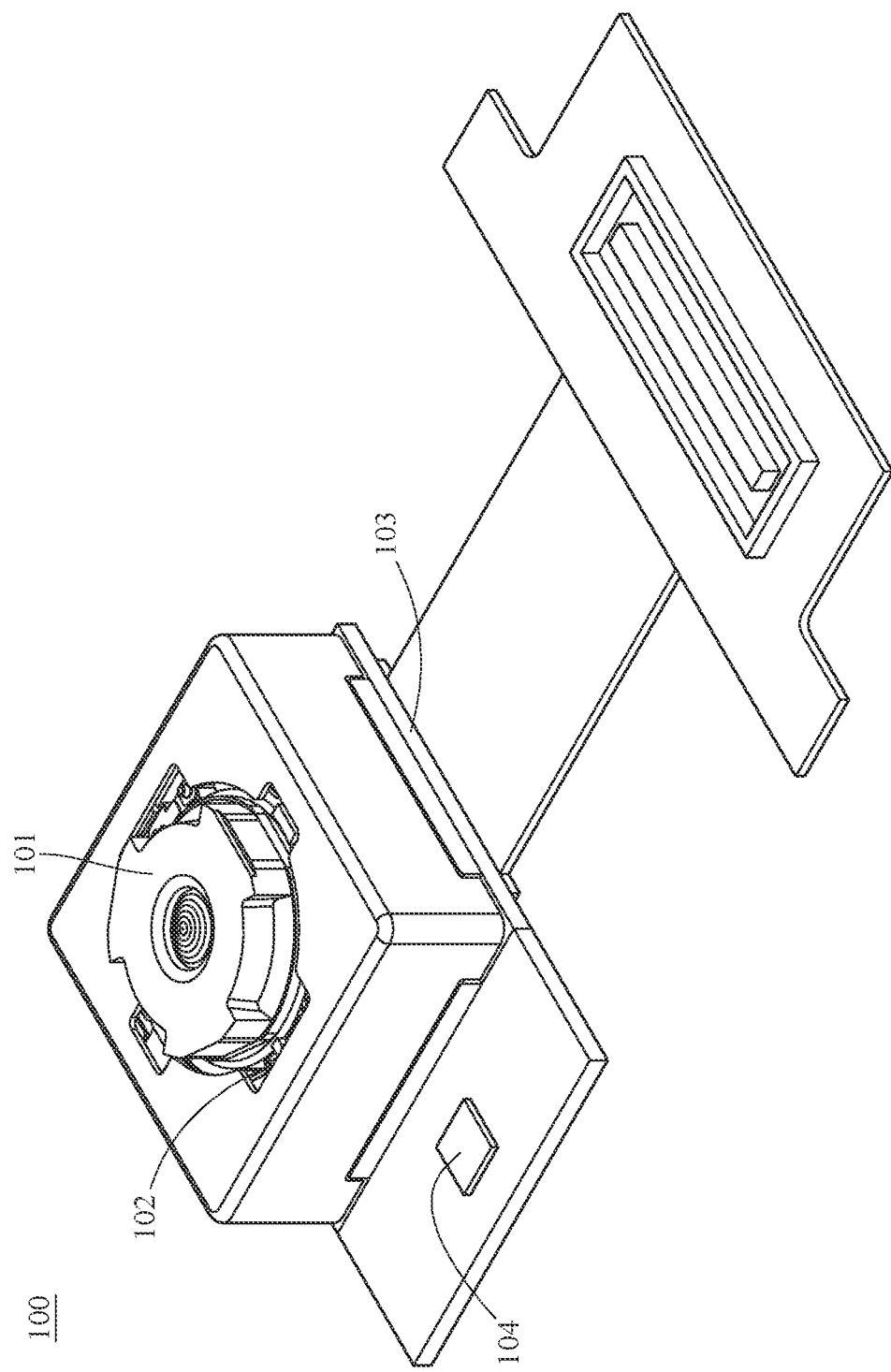
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the imaging lens system disclosed in the 1st embodiment, a barrel and a holder member (their reference numerals are omitted) for holding the imaging lens system. However, the lens unit 101 may alternatively be provided with the imaging lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the image surface of the imaging lens system to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
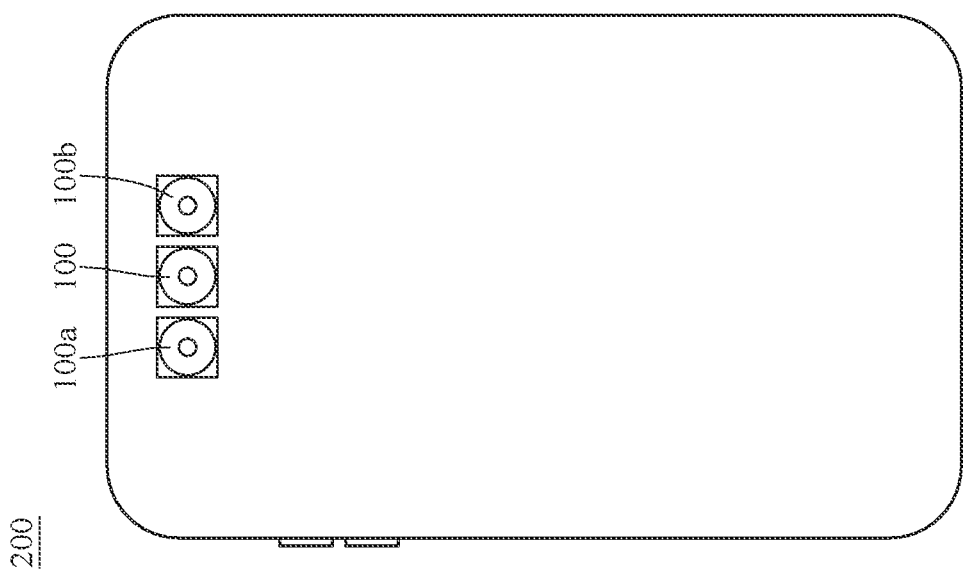
FIG. 18 is one perspective view of an electronic device according to the 10th embodiment of the present disclosure.
Figure 19:
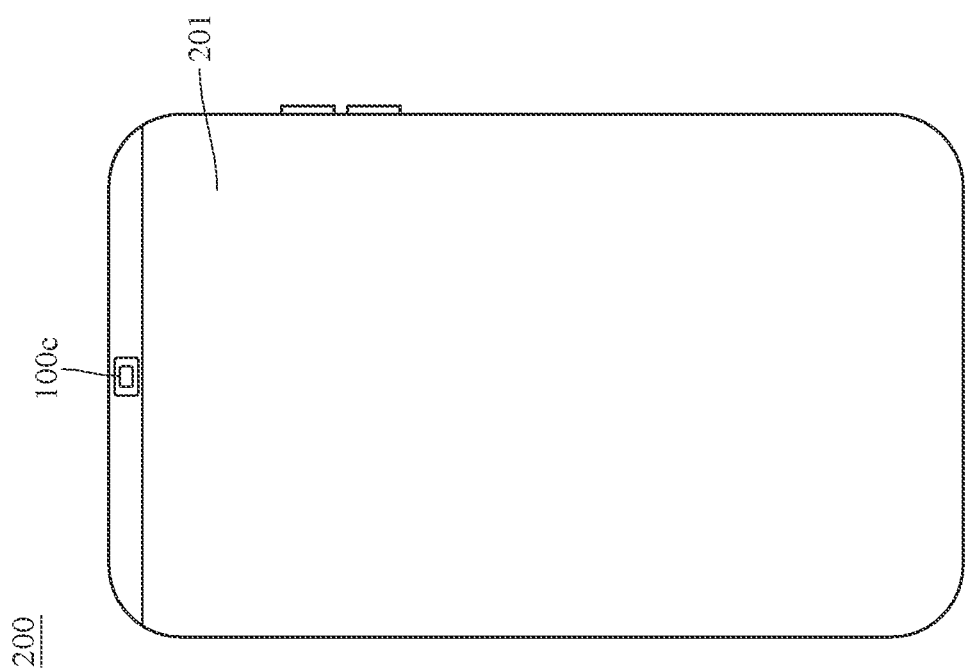
FIG. 19 is another perspective view of the electronic device in FIG. 18.

FIG. 18 is one perspective view of an electronic device according to the 10th embodiment of the present disclosure. FIG. 19 is another perspective view of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c and a display unit 201. As shown in FIG. 18, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 19, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the imaging lens system of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an imaging lens system such as the imaging lens system of the present disclosure, a barrel and a holder member for holding the imaging lens system.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 19, the image capturing unit 100c can have a non-circular opening, and the optical elements in the image capturing unit 100c can have one or more trimmed edges at outer diameter positions thereof for corresponding to the non-circular opening. Therefore, it is favorable for further reducing the size of the image capturing unit 100c, thereby increasing the area ratio of the display unit 201 with respect to the electronic device 200 and reducing the thickness of the electronic device 200. In this embodiment, the electronic device 200 includes multiple image capturing units 100, 100a, 100b and 100c, but the present disclosure is not limited to the number and arrangement of image capturing units.

11th Embodiment

Figure 20:
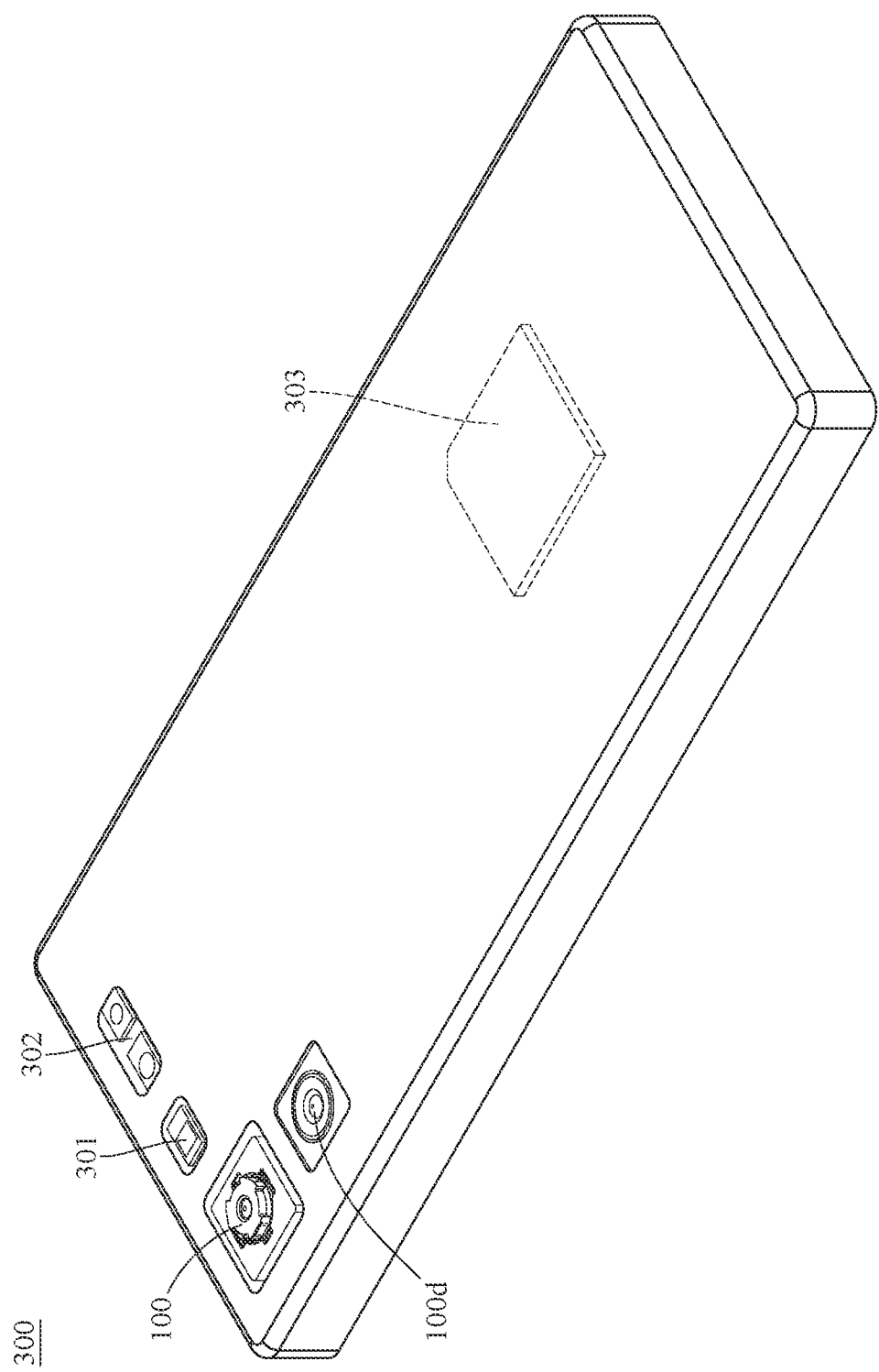
FIG. 20 is one perspective view of an electronic device according to the 11th embodiment of the present disclosure.
Figure 21:
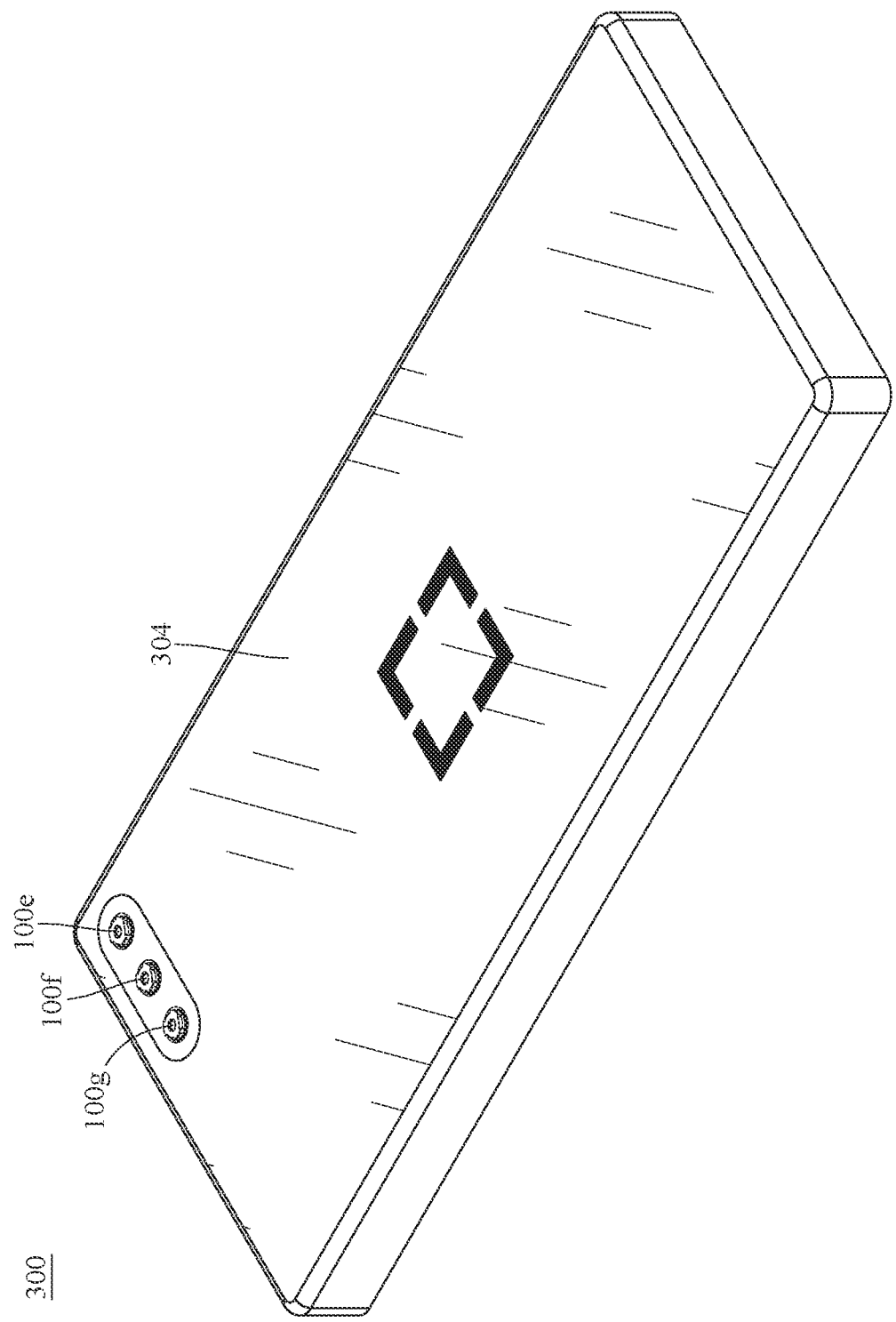
FIG. 21 is another perspective view of the electronic device in FIG. 20.
Figure 22:
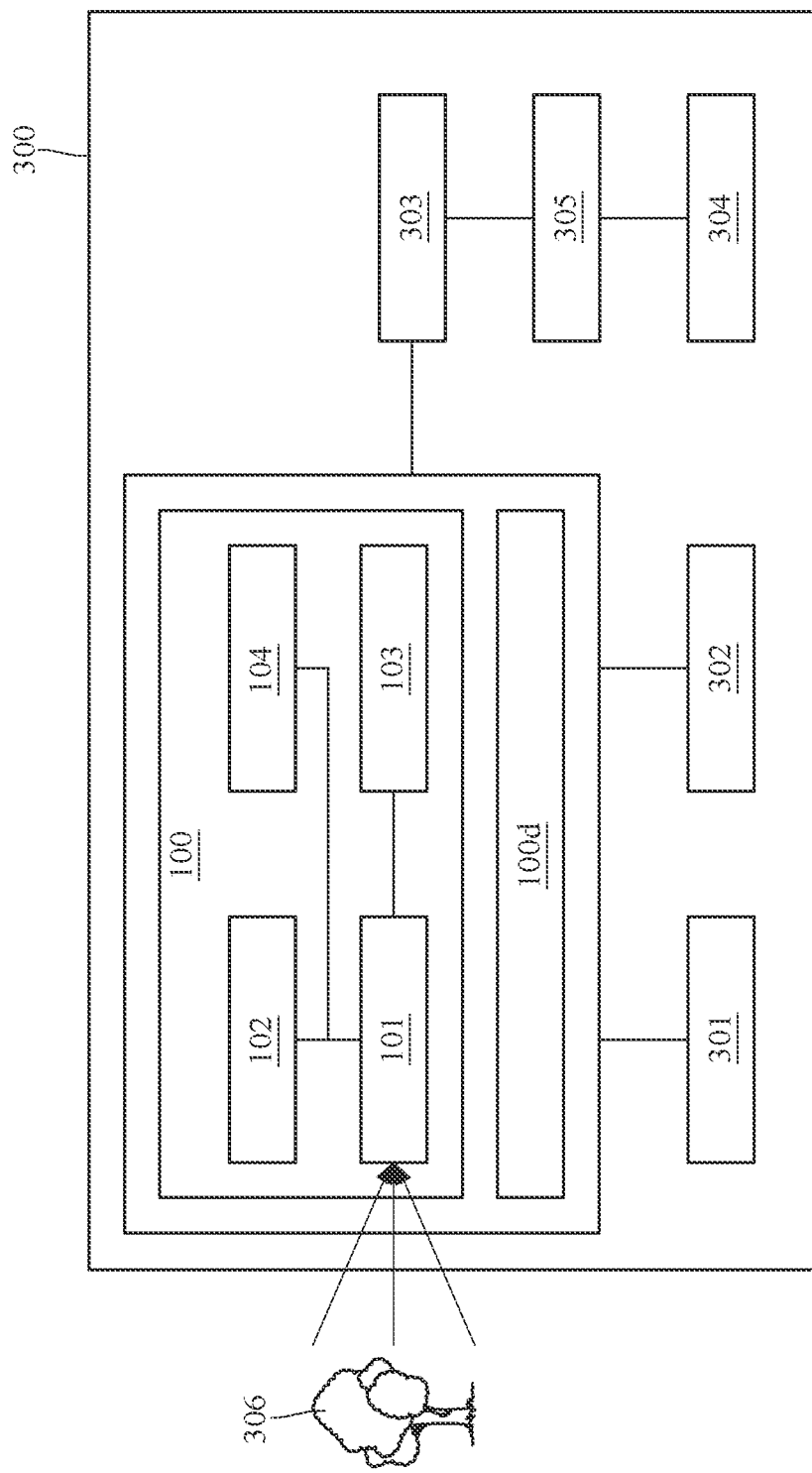
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 300 is a smartphone including the image capturing unit 100 disclosed in the 9th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the imaging lens system of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include an imaging lens system such as the imaging lens system of the present disclosure, a barrel and a holder member for holding the imaging lens system.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100 and 100d have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

12th Embodiment

Figure 23:
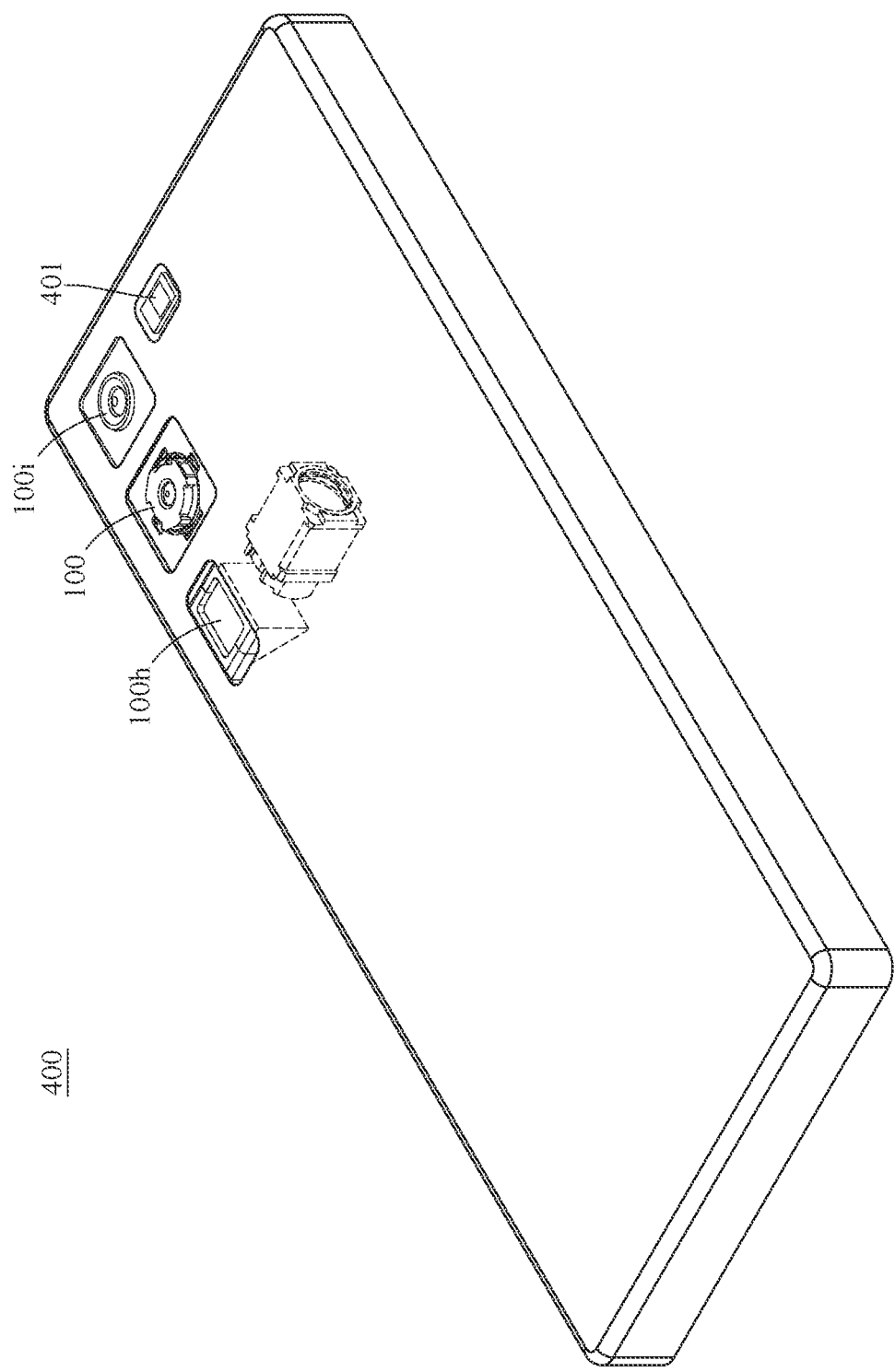
FIG. 23 is one perspective view of an electronic device according to the 12th embodiment of the present disclosure.

FIG. 23 is one perspective view of an electronic device according to the 12th embodiment of the present disclosure.

In this embodiment, an electronic device 400 is a smartphone including the image capturing unit 100 disclosed in the 9th embodiment, an image capturing unit 100h, an image capturing unit 100i, a flash module 401, a focus assist module, an image signal processor, a display module and an image software processor (not shown). The image capturing unit 100, the image capturing unit 100h and the image capturing unit 100i are disposed on the same side of the electronic device 400, while the display module is disposed on the opposite side of the electronic device 400. Furthermore, each of the image capturing units 100h and 100i can include the imaging lens system of the present disclosure and can have a configuration similar to that of the image capturing unit 100, and the details in this regard will not be provided again.

The image capturing unit 100 is a wide-angle image capturing unit, the image capturing unit 100h is a telephoto image capturing unit, and the image capturing unit 100i is an ultra-wide-angle image capturing unit. In this embodiment, the image capturing units 100, 100h and 100i have different fields of view, such that the electronic device 400 can have various magnification ratios so as to meet the requirement of optical zoom functionality. Moreover, the image capturing unit 100h can be a telephoto image capturing unit having a light-folding element configuration, such that the total track length of the image capturing unit 100h is not limited by the thickness of the electronic device 400. Moreover, the light-folding element configuration of the image capturing unit 100h can be similar to, for example, one of the structures shown in FIG. 29 to FIG. 31, which can be referred to foregoing descriptions corresponding to FIG. 29 to FIG. 31, and the details in this regard will not be provided again. In this embodiment, the electronic device 400 includes multiple image capturing units 100, 100h and 100i, but the present disclosure is not limited to the number and arrangement of image capturing units. When a user captures images of an object, light rays converge in the image capturing unit 100, 100h or 100i to generate images, and the flash module 401 is activated for light supplement. Further, the subsequent processes are performed in a manner similar to the abovementioned embodiment, so the details in this regard will not be provided again.

13th Embodiment

Figure 24:
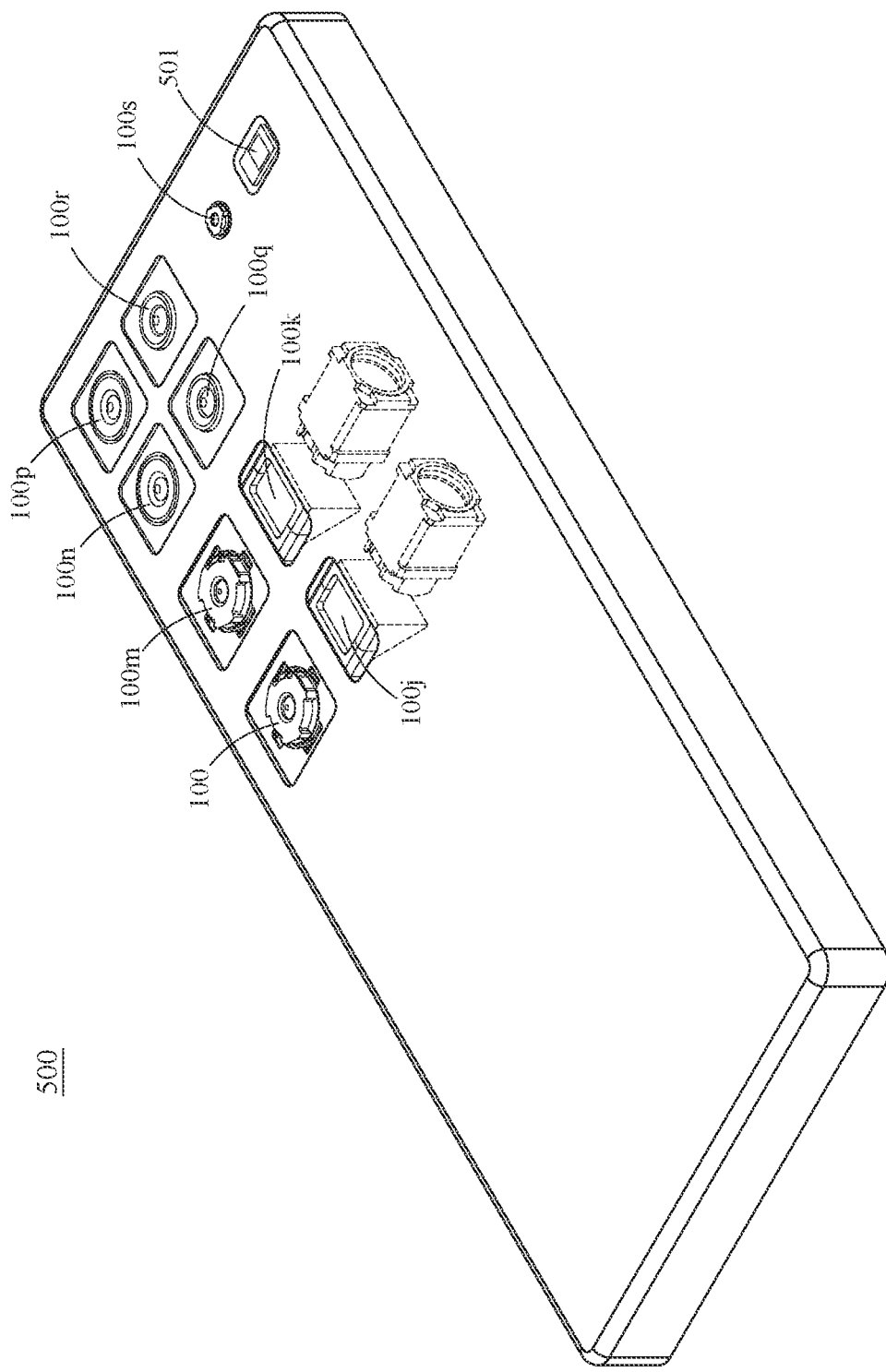
FIG. 24 is one perspective view of an electronic device according to the 13th embodiment of the present disclosure.

FIG. 24 is one perspective view of an electronic device according to the 13th embodiment of the present disclosure.

In this embodiment, an electronic device 500 is a smartphone including the image capturing unit 100 disclosed in the 9th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the imaging lens system of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 29 to FIG. 31, which can be referred to foregoing descriptions corresponding to FIG. 29 to FIG. 31, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement.

Further, the subsequent processes are performed in a manner similar to the abovementioned embodiments, and the details in this regard will not be provided again.

14th Embodiment

Figure 25:
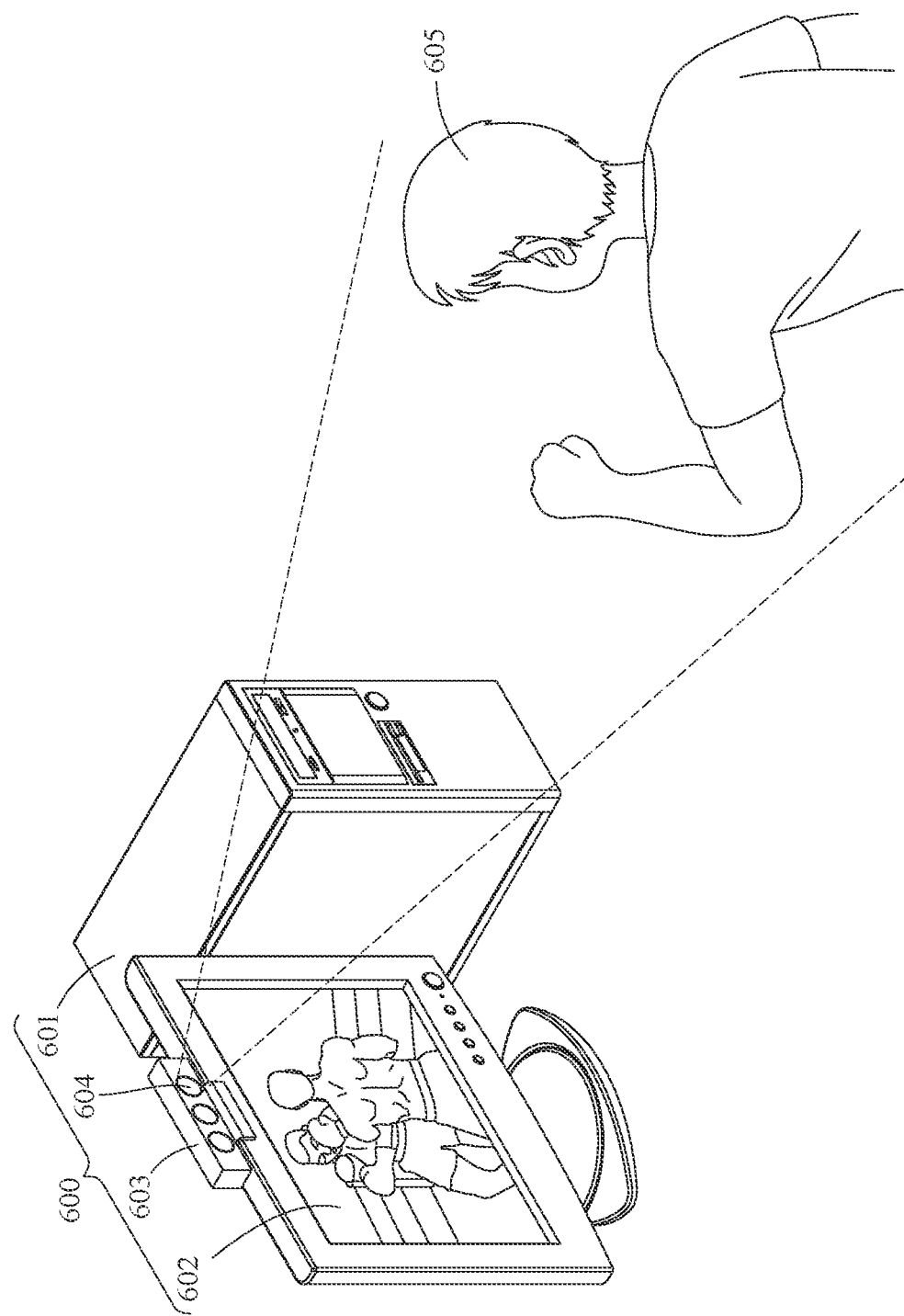
FIG. 25 is a schematic view of an electronic device according to the 14th embodiment of the present disclosure.

FIG. 25 is a schematic view of an electronic device according to the 14th embodiment of the present disclosure.

In this embodiment, an electronic device 600 may be an image recognition device applied to motion sensing input devices. The electronic device 600 includes a computer 601, a display unit 602 and an image capturing unit 603. The display unit 602 is electrically connected to the computer 601, and the image capturing unit 603 is electrically connected to the computer 601 and the display unit 602. The image capturing unit 603 includes a camera 604, and the camera 604 includes the imaging lens system disclosed in the 1st embodiment. The image capturing unit 603, which can be similar to the image capturing unit 100, further includes a barrel, a holder member or a combination thereof. The electronic device 600 captures an image of a user 605 by the image capturing unit 603, and the captured image is processed by an image processing software installed in the computer 601 to realize motion detection and face recognition.

Figure 26:
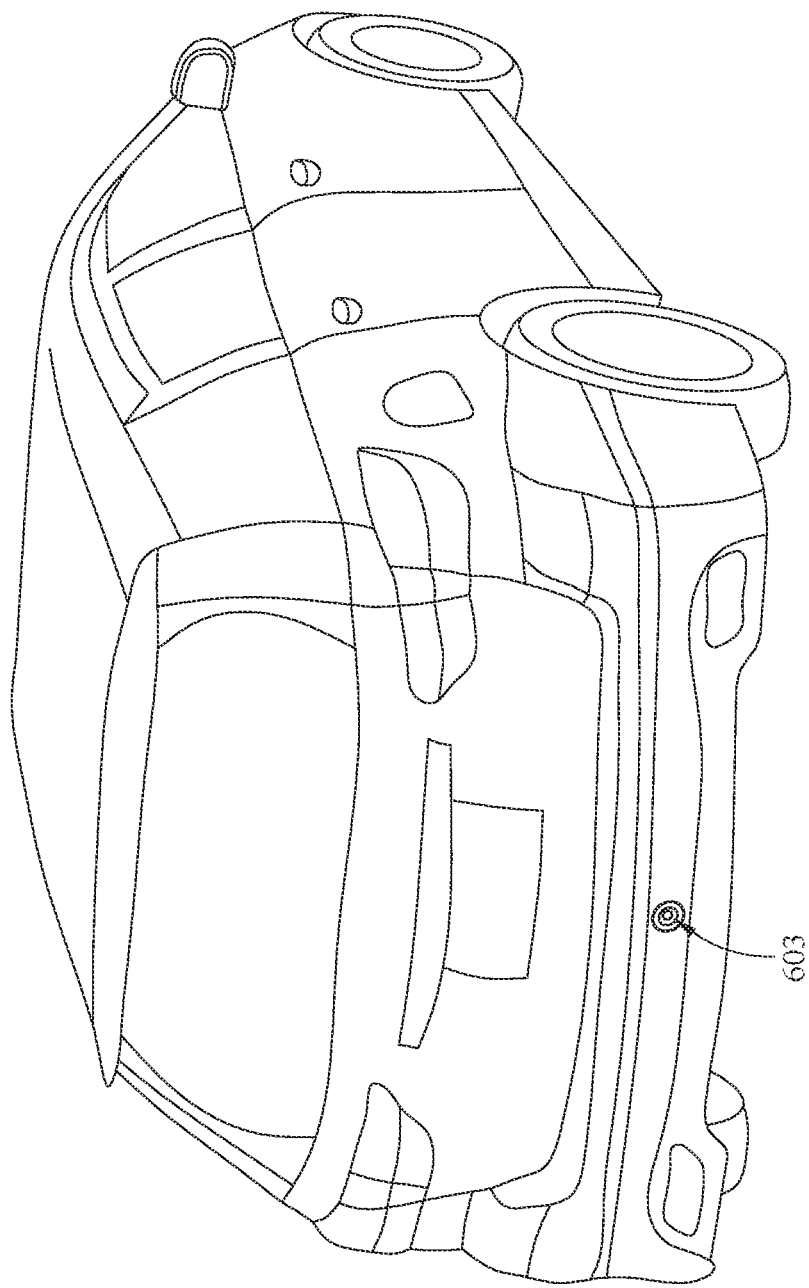
FIG. 26 is a schematic view of an electronic device according to the 15th embodiment of the present disclosure.
Figure 27:
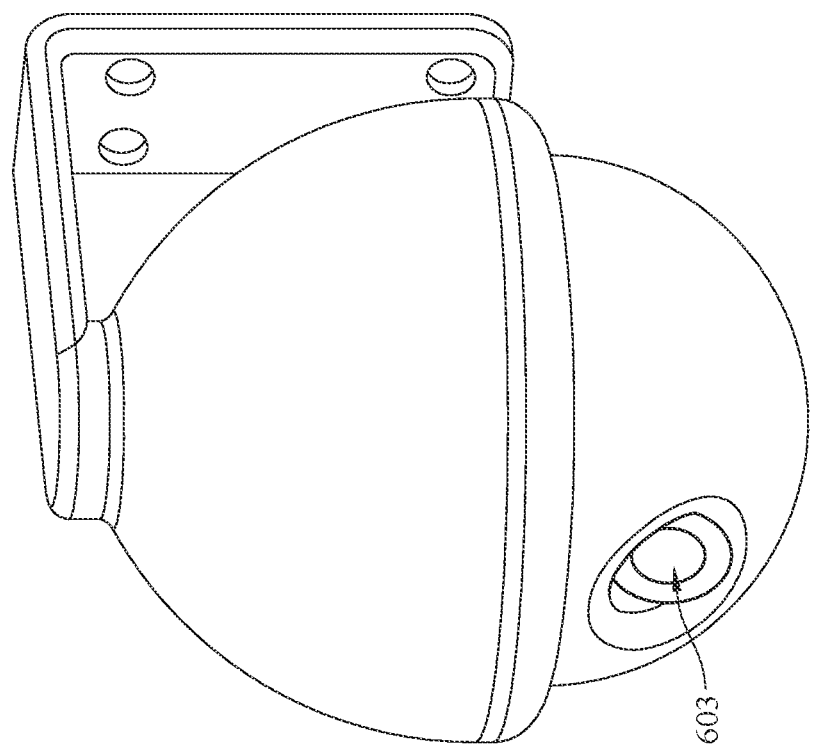
FIG. 27 is a schematic view of an electronic device according to the 16th embodiment of the present disclosure.
Figure 28:
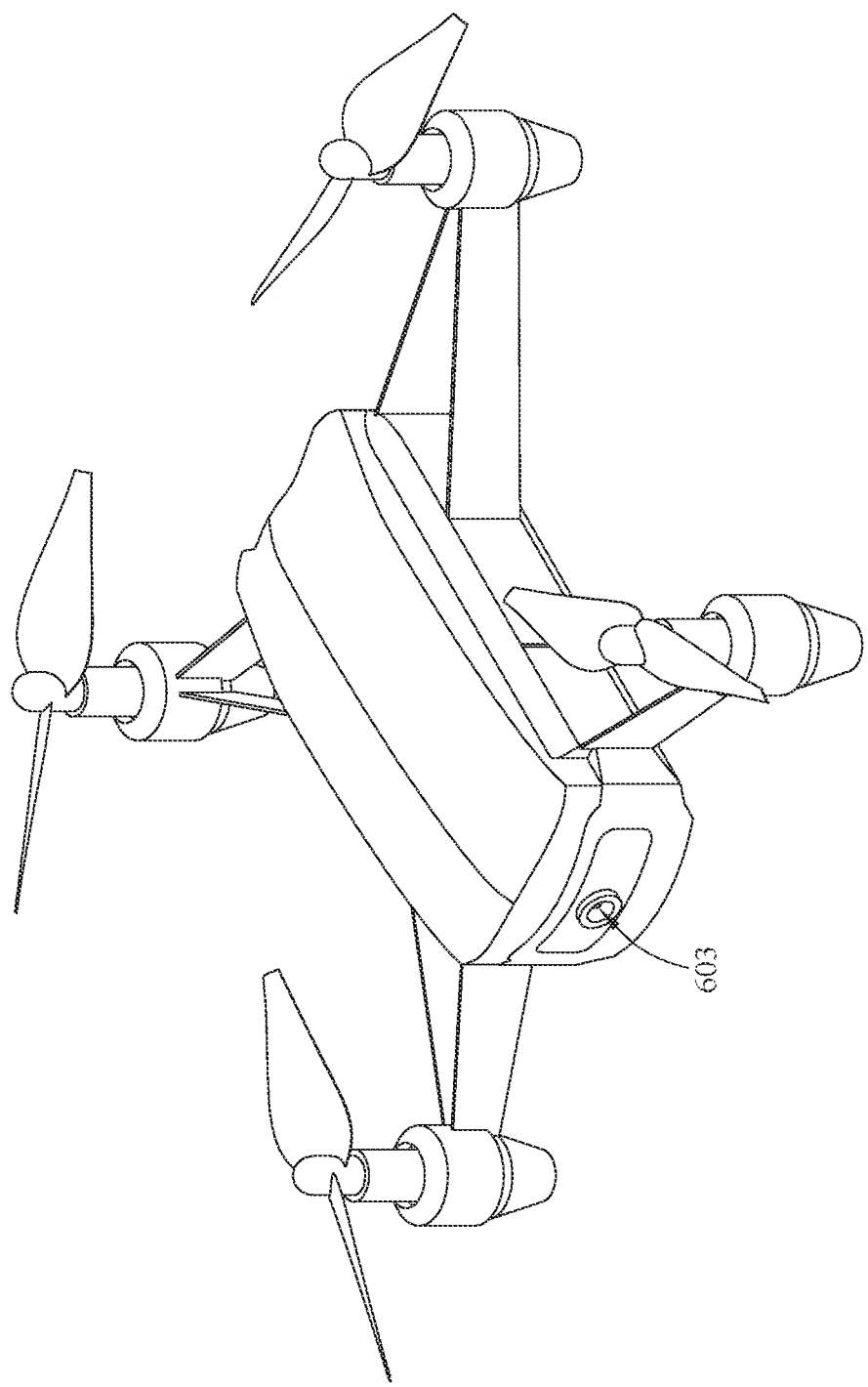
FIG. 28 is a schematic view of an electronic device according to the 17th embodiment of the present disclosure.

In this embodiment, the image capturing unit 603 is applied to the electronic device 600, but the present disclosure is not limited thereto. The image capturing unit 603 may be applied to other electronic devices, such as a vehicle backup camera (Please refer to FIG. 26, which is a schematic view of an electronic device according to the 15th embodiment of the present disclosure), a security surveillance device (Please refer to FIG. 27, which is a schematic view of an electronic device according to the 16th embodiment of the present disclosure) or an unmanned aerial vehicle (e.g., a drone camera; Please refer to FIG. 28, which is a schematic view of an electronic device according to the 17th embodiment of the present disclosure). In some cases, the electronic device may further include a control unit, a display unit, a storage unit, a random access memory unit (RAM) or a combination thereof.

The smartphone, the image recognition device, the vehicle backup camera, the security surveillance device or the unmanned aerial vehicle in this embodiment is only exemplary for showing the image capturing unit of the present disclosure installed in an electronic device, and the present disclosure is not limited thereto. The image capturing unit can be optionally applied to optical systems with a movable focus. Furthermore, the imaging lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, multi-camera devices, wearable devices and other electronic imaging devices.

The foregoing description, for the purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the object-side surface of the third lens element is concave in a paraxial region thereof; and the fifth lens element has negative refractive power;

wherein a curvature radius of the object-side surface of the second lens element is R3, a curvature radius of the image-side surface of the second lens element is R4, a curvature radius of the object-side surface of the third lens element is R5, a curvature radius of the object-side surface of the fourth lens element is R7, a curvature radius of the image-side surface of the fifth lens element is R10, a central thickness of the third lens element is CT3, a focal length of the imaging lens system is f, a focal length of the fifth lens element is f5, an axial distance between the first lens element and the second lens element is T12, and the following conditions are satisfied:

$(R3+R4)/(R3-R4)<0.90;$ $(R7+R10)/(R7-R10)<0.85;$ $0.26<CT3/f<2.20;$ $-1.60<f/f5<0.00;$ $f/R5<-0.20;$ and $0.30<T12/f<1.15.$ 2. The imaging lens system of claim 1, wherein the object-side surface of the fourth lens element is convex in a paraxial region thereof, an f-number of the imaging lens system is FNO, and the following condition is satisfied:

$1.00<FNO<2.50.$

3. The imaging lens system of claim 1, wherein the focal length of the imaging lens system is f, a composite focal length of the seventh lens element and the eighth lens element is f78, and the following condition is satisfied:

$-0.90<f/f78<0.20.$

4. The imaging lens system of claim 1, wherein the focal length of the imaging lens system is f, a composite focal length of the fourth lens element and the fifth lens element is f45, and the following condition is satisfied:

$0.00<f/f45<1.80.$

5. The imaging lens system of claim 1, wherein the axial distance between the first lens element and the second lens element is T12, an axial distance between the object-side surface of the first lens element and the image-side surface of the eighth lens element is TD, a central thickness of the first lens element is CT1, the focal length of the imaging lens system is f, and the following conditions are satisfied:

$0.10<T12/TD<0.30;$ and $0.15<CT1/f<0.55.$

6. The imaging lens system of claim 1, wherein the object-side surface of the sixth lens element is convex in a paraxial region thereof, a refractive index of the fourth lens element is N4, a refractive index of the fifth lens element is N5, and the following condition is satisfied:

$1.63<(N4+N5)/2<1.95.$

7. The imaging lens system of claim 1, wherein a curvature radius of the object-side surface of the first lens element is R1, a curvature radius of the image-side surface of the first lens element is R2, an Abbe number of the fourth lens element is V4, and the following conditions are satisfied:

$-1.40<(R1+R2)/(R1-R2);$ and $32.0<V4<72.0.$

8. An image capturing unit, comprising:
the imaging lens system of claim 1; and
an image sensor disposed on an image surface of the imaging lens system.

9. An electronic device, comprising:
the image capturing unit of claim 8.

* * * * *

UNITED STATES PATENT AND TRADEMARK OFFICE
CERTIFICATE OF CORRECTION

| | | |
|---|---|---|
| PATENT NO. | : 12,481,131 B2 | Page 1 of 1 |
| APPLICATION NO. | : 17/825681 | |
| DATED | : November 25, 2025 | |
| INVENTOR(S) | : Chun-Che Hsueh and Meng-Kuan Cho | |

It is certified that error appears in the above-identified patent and that said Letters Patent is hereby corrected as shown below:

On the Title Page

Column 1, Item (30), insert:
-- Foreign Application Priority Data:
Mar. 31, 2022 (TW) ……………………… 111112551 --

Signed and Sealed this
Third Day of February, 2026

John A. Squires
*Director of the United States Patent and Trademark Office*